US 7,692,831 B2

(12) United States Patent
Nishikawa

(10) Patent No.: US 7,692,831 B2
(45) Date of Patent: Apr. 6, 2010

(54) IMAGE PROCESSING APPARATUS AND METHOD THEREOF

(75) Inventor: Naoyuki Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1098 days.

(21) Appl. No.: 11/301,351

(22) Filed: Dec. 13, 2005

(65) Prior Publication Data

US 2006/0139668 A1    Jun. 29, 2006

(30) Foreign Application Priority Data

Dec. 13, 2004  (JP)  ............................. 2004-360501
Dec. 13, 2004  (JP)  ............................. 2004-360502
Dec. 13, 2004  (JP)  ............................. 2004-360503

(51) Int. Cl.
*G03F 3/08* (2006.01)
*H04N 1/60* (2006.01)
*H04N 1/46* (2006.01)

(52) U.S. Cl. ........................ 358/518; 358/1.9; 358/523; 358/504; 358/538; 358/540; 382/162; 382/167; 382/164

(58) Field of Classification Search ................. 358/518, 358/1.9, 3.26, 523, 504, 1.18, 2.1, 538, 540, 358/1.16; 382/162, 167, 164, 302; 715/523
See application file for complete search history.

(56) References Cited

U.S. PATENT DOCUMENTS

| 6,847,377 | B2 | 1/2005 | Kitahara et al. |
| 7,038,707 | B2 | 5/2006 | Shimizu |
| 7,085,006 | B2 | 8/2006 | Yokoyama et al. |
| 7,280,258 | B2 | 10/2007 | Kitahara et al. |
| 7,292,369 | B2 | 11/2007 | Yokoyama et al. |
| 7,433,102 | B2 | 10/2008 | Takahashi et al. |
| 7,525,701 | B2 | 4/2009 | Kubo |
| 2003/0002060 | A1 | 1/2003 | Yokoyama et al. |
| 2003/0117636 | A1 | 6/2003 | Nishikawa ................... 358/1.9 |
| 2004/0083430 | A1* | 4/2004 | Boonen ....................... 715/523 |

(Continued)

FOREIGN PATENT DOCUMENTS

JP            9-163171            6/1997

(Continued)

OTHER PUBLICATIONS

Office Action dated Aug. 10, 2009 in JP 2004-360501.

(Continued)

*Primary Examiner*—Charlotte M Baker
(74) *Attorney, Agent, or Firm*—Fitzpatrick, Cella, Harper & Scinto

(57) ABSTRACT

No scheme for calculating a color obtained by mixing two spot colors (composite spot color) has been established yet. Hence, an image processing apparatus of this invention includes a spectral database which stores spectral data of spot colors and mixed colors of the spot colors. Upon rendering, a mixed color region of spot colors is detected. A colorimetry table of the spectral DB which corresponds to a combination of the spot colors of the mixed color region is selected with reference to a combination table of the spectral DB. Spectral data corresponding to a mixed color is obtained from the colorimetry table on the basis of the density values of the spot colors of the mixed color region, and the obtained spectral data is supplied to rendering processing.

11 Claims, 24 Drawing Sheets

U.S. PATENT DOCUMENTS

| | | | |
|---|---|---|---|
| 2005/0179917 A1* | 8/2005 | Yoshikawa et al. | 358/1.9 |
| 2006/0098233 A1* | 5/2006 | Jodra et al. | 358/3.26 |
| 2006/0274974 A1 | 12/2006 | Nishikawa | 382/284 |
| 2008/0013112 A1 | 1/2008 | Yokoyama et al. | |

FOREIGN PATENT DOCUMENTS

| | | |
|---|---|---|
| JP | 2000-165667 | 6/2000 |
| JP | 2001-136401 | 5/2001 |
| JP | 2002-288682 | 10/2002 |
| JP | 2002-365133 | 12/2002 |
| JP | 2003-145842 | 5/2003 |
| JP | 2003-326768 | 11/2003 |
| JP | 2004-80257 | 3/2004 |
| JP | 2004-212425 | 7/2004 |
| JP | 2006-504191 | 2/2006 |
| WO | 2004-040514 | 5/2004 |

OTHER PUBLICATIONS

Office Action dated Aug. 10, 2009 in JP 2004-360503.

* cited by examiner

FIG. 7

| COMBINATION OF SPOT COLORS | TABLE NUMBER |
|---|---|
| RED + GREEN | 1 |
| GREEN + ORANGE | 2 |
| ⋮ | ⋮ |

IMAGE PROCESSING APPARATUS AND METHOD THEREOF

FIELD OF THE INVENTION

The present invention relates to an image processing apparatus and method thereof and, more particularly, to image processing for color-reproducing spot colors, a mixed color region of spot colors, and a mixed color region including spot colors.

BACKGROUND OF THE INVENTION

In general, printing and publishing processes, color proof is made using a proofer, an electrophotographic or ink-jet color printer, or a monitor of a personal computer (PC) or the like prior to main print processing. A technique required in such case pertains to color simulation that accurately reproduces colors of a printing machine used in main print processing.

The printing machine normally expresses colors by a subtractive process using four color materials, i.e., cyan (C), magenta (M), yellow (Y), and black (K), and these four colors are called process colors. A printer that performs color simulation or the like can reproduce mixed colors using the process colors of the printing machine by a color management technique. More specifically, profiles as databases that describe the device characteristics are used to absorb a color reproducibility difference between devices and, for example, device A can simulate the characteristics of another device B. Upon applying to color calibration of print processing, device A corresponds to a printer or monitor for simulation, and device B corresponds to a printing machine.

However, the printing machine often uses color materials other than the process colors called spot color inks in addition to the process colors. This is to meet the demand to use colors which are hardly reproduced by mixing the process colors, and to suppress cost. In order to simulate such spot color by a printer or the like, the spot color is expressed by a color value (Lab value) on a device independent color space (DIC space) such as an L*a*b* color space or the like on the basis of the name of the spot color, and the Lab value is converted into a value such as a CMYK value or the like on a device dependent color space.

No scheme for calculating a color obtained by mixing two spot colors (to be referred to as "composite spot color" hereinafter) has been established yet. For example, as a method of reproducing such composite spot color, a method of calculating one color value from the two color values of two spot colors on the DIC space using an arbitrary method may be used. However, this calculation can give an approximately correct value, but it cannot be an accurate calculation method. For example, if a cyan value upon converting a given spot color into a CMYK value is 90%, and that upon converting another spot color into a CMYK value is 80%, a cyan value upon compositing these two spot colors is 170% if their densities are simply added. However, the upper limit of the density value is 100%, and inconsistency occurs.

Even in case of the DIC space, since color spaces such as L*a*b*, XYZ, and the like, which are popularly used in color management, have nonlinear characteristics, it is impossible in principle to calculate color composition by means of addition, multiplication, or the like.

SUMMARY OF THE INVENTION

The first aspect of the present invention discloses an image processing method of processing an input image which uses a color material of a spot color except for process colors, the method comprising the steps of: detecting a mixed color region, where spot colors are mixed, from the input image; calculating a calorimetric value of the detected mixed color region by using density of each spot color in the detected mixed color region and colorimetric values stored in a memory, wherein the memory stores the calorimetric values of colors represented by mixing spot colors; and converting the calculated calorimetric value into color data depend on an output device.

According to the present invention, the mixed color region of spot colors can be accurately color-reproduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 shows an example of a combination table;

DETAILED DESCRIPTION OF THE PREFERRED EMBODIMENTS

Image processing according to the preferred embodiments of the present invention will be described in detail hereinafter with reference to the accompanying drawings.

First Embodiment

[Arrangement of Printing Server]

Figure 1:
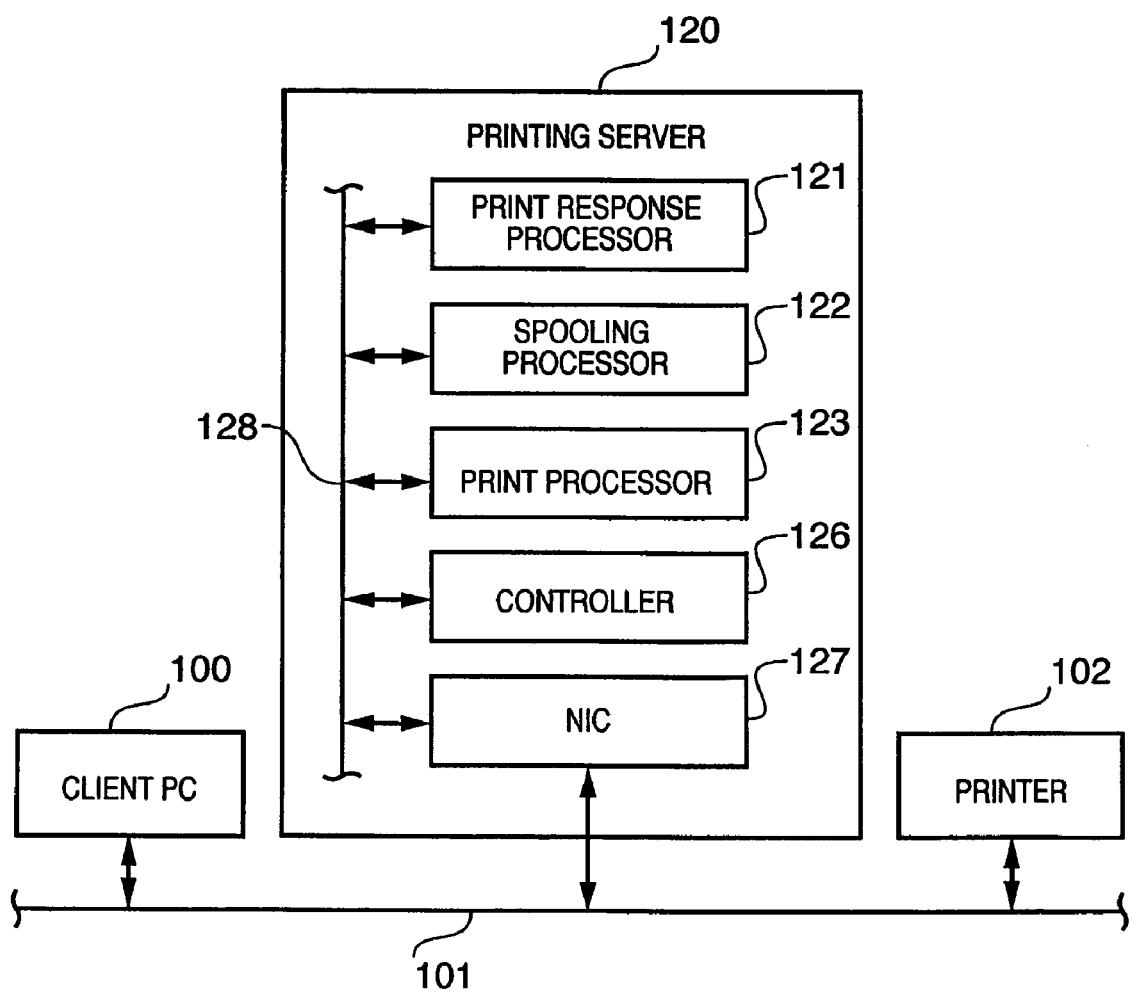
FIG. 1 is a block diagram showing the arrangement of a printing server.

FIG. 1 is a block diagram showing the arrangement of a printing server of this embodiment.

A printing server 120 can be implemented by, e.g., supplying software that executes processing to be described later to a computer apparatus which has a CPU, RAM, and ROM. Of course, the printing server 120 can also be implemented by forming functional blocks to be described later by hardware components, and combining these functional blocks.

The printing server 120 connects a network 101 via a network interface card (NIC) 127, and receives data (to be referred to as "PDL data" hereinafter) which includes spot color information and is described using a page (or band) description language from a client PC 100. Output data of a CMYK value obtained by rendering the PDL data is sent to a printer 102 to execute print processing. Note that the printing server 120 outputs data of a CMYK value when color calibration is made using the printer 102, but it outputs data of an RGB value when color calibration is made using a monitor.

A print response processor 121 of the printing server 120 executes reception processing of PDL data transmitted from the client PC 100 in response to a print request of the client PC 100 input via the network 101. A spooling processor 122 temporarily stores the PDL data received by the print response processor 121 in a spool area assigned to a memory such as a RAM, hard disk, or the like in the printing server 120. A print processor 123 reads out the PDL data from the spool area, and interprets and renders the readout PDL data as will be described in detail later. A controller 126 systematically controls the processes of the aforementioned units via a system bus 128.

Figure 2:
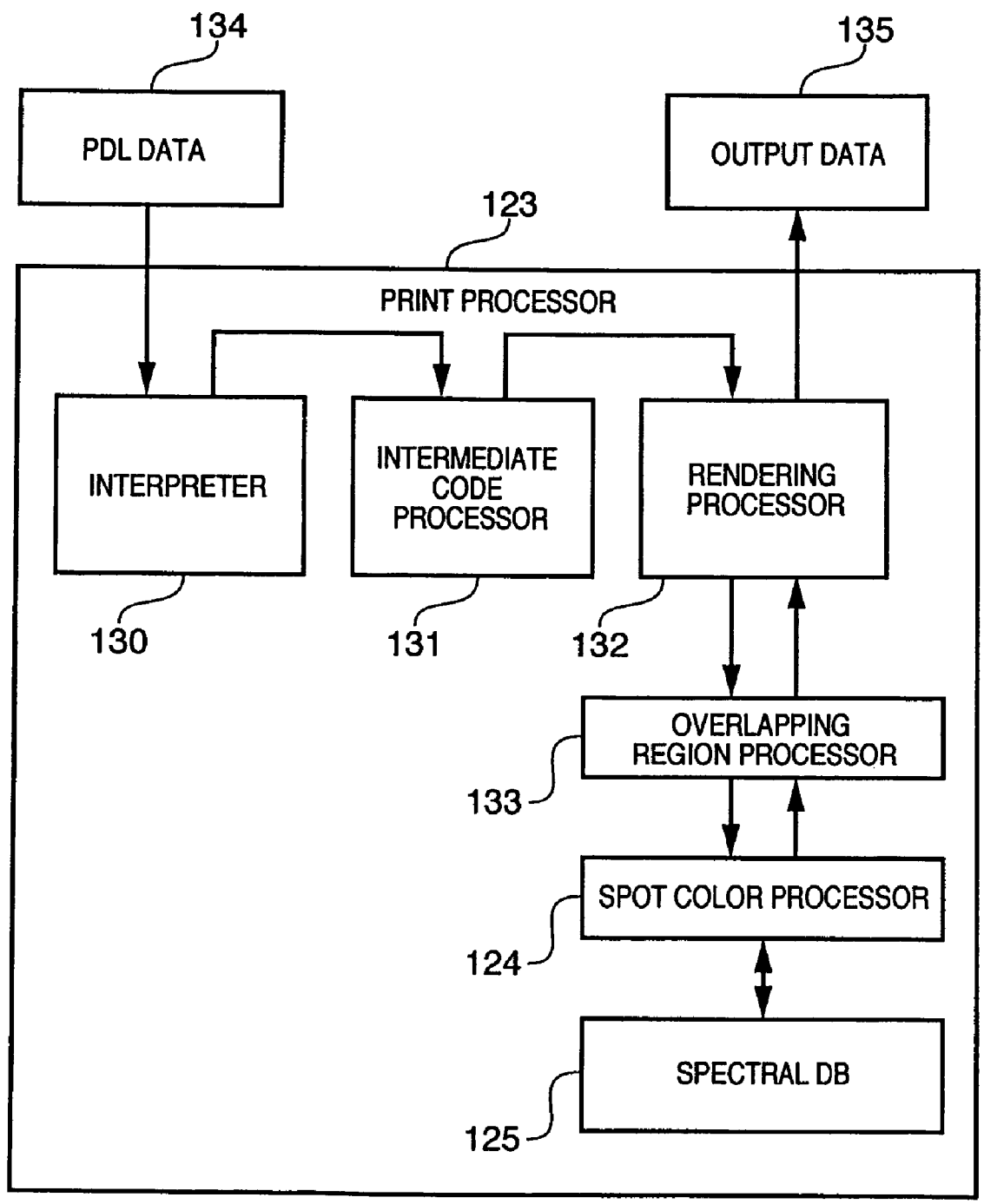
FIG. 2 is a block diagram showing the arrangement of a print processor.

FIG. 2 is a block diagram showing an example of the arrangement of the print processor 123.

PDL data 134 loaded into the print processor 123 is interpreted by an interpreter 130 and is converted into intermediate code data. An intermediate code processor 131 applies required processing, e.g., sort processing, imposition processing, and the like to the intermediate code data, and a rendering processor 132 then renders the processed intermediate code data and outputs the rendered data as output data 135. The rendering processor 132 checks objects such as text, line image, picture, table, and the like of the input intermediate code data, and controls an overlapping region processor 133 to process an overlapping portion of objects (overlapping region).

The overlapping region processor 133 refers to the intermediate code data for an overlapping portion of spot colors in the overlapping region and instructs the names and density values of these spot colors to a spot color processor 124. As will be described in detail later, the spot color processor 124 obtains a color value (e.g., Lab value) of a composite spot color on the basis of spectral data stored in a spectral database (DB) 125. Note that the spectral DB 125 is stored in a memory such as a hard disk or the like of the printings server 120.

In this manner, the rendering processor 132 can obtain the color value of the spot color, executes a color matching process on the obtained color value, generates output data 135 such as a CMYK value or the like corresponding to the spot color, and performs rendering processing using the generated CMYK value.

In the first embodiment, the color matching process is performed on colors except for the spot color by using a profile of the input device and a profile of an output device to convert an input color to a device value. For example, when the input color indicated by a CMYK value and the device value of the output device is a CMYK value, the input color is converted to an Lab value by using a CMYK to Lab conversion table of an input device, and the Lab value is converted to the CMYK value by using an Lab to CMYK conversion table of the output device.

On the other hand, the spot color is converted to a color value by the overlapping region processor 133, the spot color processor 124 and the spectral DB 125, and then the color value is converted to the device value by the color matching process of the rendering processor 132. For example, when the output device is a CMYK device, a color value (ex. an Lab value) is converted to a CMYK value depend on the output device by using an Lab to CMYK conversion table of the output device. The composite spot color and the spot color are processed in the same way.

Note that conversion from spectral data into an Lab value is executed that three color perceptual stimulus characteristics obtained by multiplying spectral data by a color matching function are integrated to be converted into an XYZ value, and the XYZ value is then converted into an Lab value.

[Segmentation of Overlapping Region]

Figure 3:
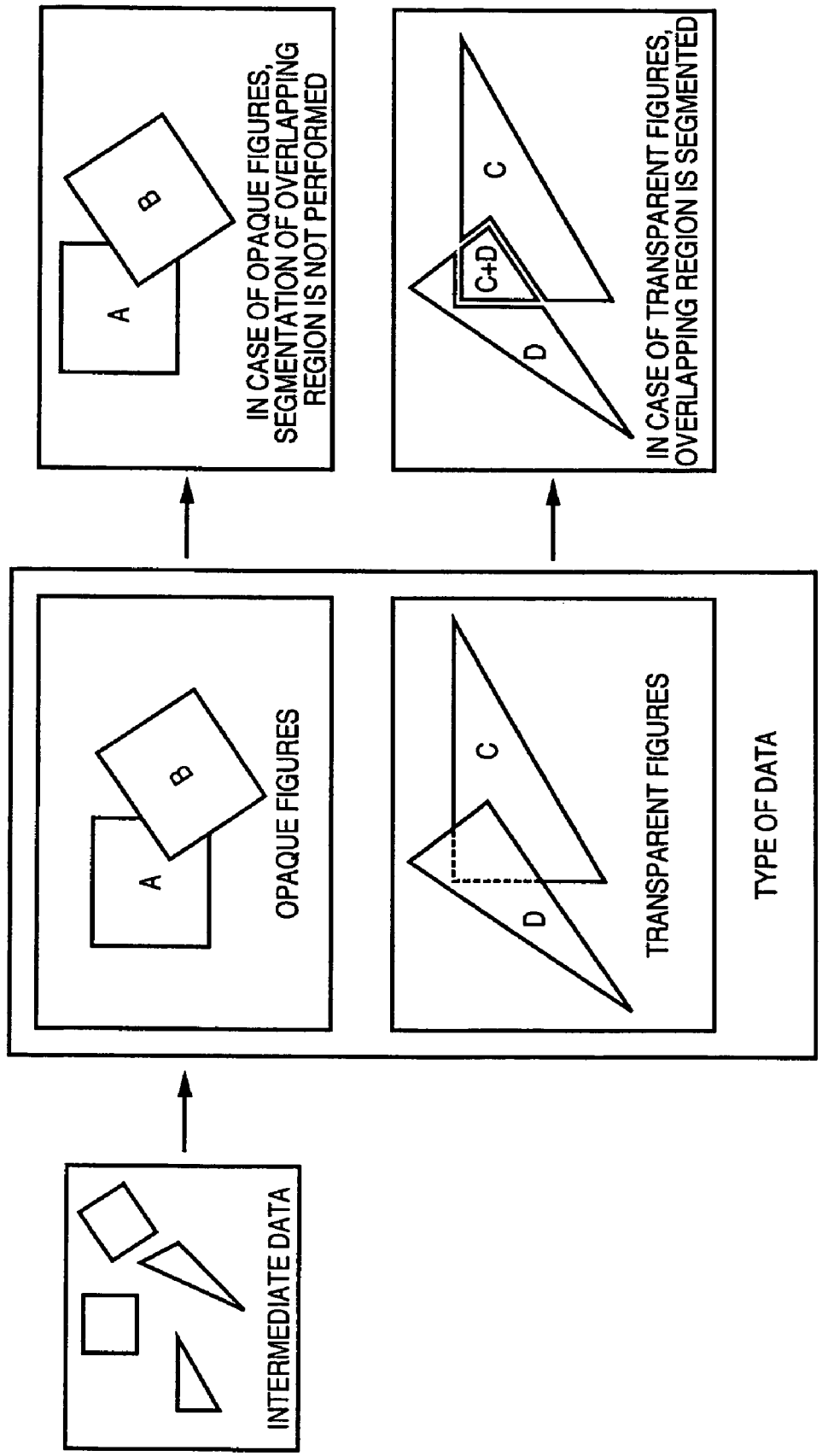
FIG. 3 is a conceptual diagram for explaining rendering processing.

FIG. 3 is a conceptual diagram for explaining the rendering processing.

Figure data included in intermediate data are applied with different processing depending on their transparency attributes. In case of opaque figures, the overlapping region need not be specified. For example, when blue rectangle A shown in FIG. 3 is rendered, and red rectangle B is rendered to overlap blue rectangle A, the overlapping region of the two rectangles is overwritten by red of rectangle B, and the color of the overlapping region need not be processed. In other words, as for opaque figures, the overlapping region need not be specified and segmented.

On the other hand, in case of transparent figures, the overlapping region must be rendered using an overlapping color (mixed color), and that region must be specified and segmented. For example, when blue triangle D is overlaid on red triangle C, as shown in FIG. 3, the color of overlapping region C+D is violet, and overlapping region C+D must be rendered using violet. Hence, overlapping region C+D is specified and segmented.

[Obtain Spectral Data of Composite Spot Color]

Figure 4:
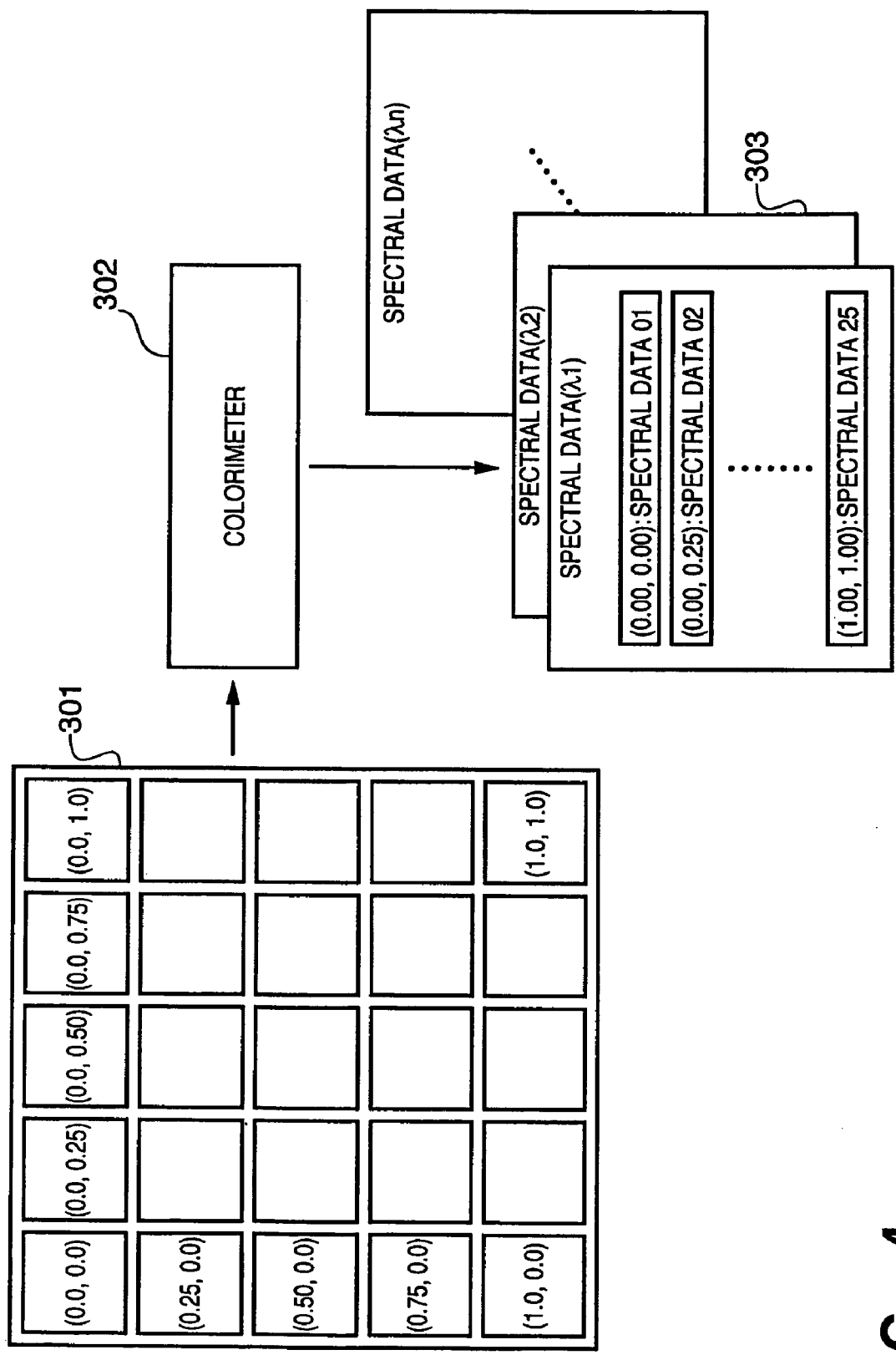
FIG. 4 is a view for explaining a method of obtaining spectral data of a composite spot color.

FIG. 4 is a view for explaining the method of obtaining spectral data of a composite spot color.

In order to examine the mixed color state of two spot colors, patches obtained by mixing spot colors while changing their densities stepwise are printed, as shown in FIG. 4. In this case, it is ideal to print patches using a combination of a printing machine and print sheets which are to undergo color calibration. Approximately, patches may be printed using a combination of another printer (e.g., the printer 102) and general-purpose print sheets.

When the density of each spot color is changed in increments of 25% within the range from 0% to 100%, five patches are obtained per spot color. By combining two spot colors, a sample chart 301 having 25 patches is formed. When a colorimeter 302 measures the sample chart 301 in increments of, e.g., 5 nm or 10 nm in a visible range, spectral data 303 indicating spectral reflectance values of the visible range can be obtained as many as combinations of the density values of the two spot colors. Of course, spectral data between the density values of neighboring patches can be calculated by interpolation calculations of the spectral data 303.

Figure 5:
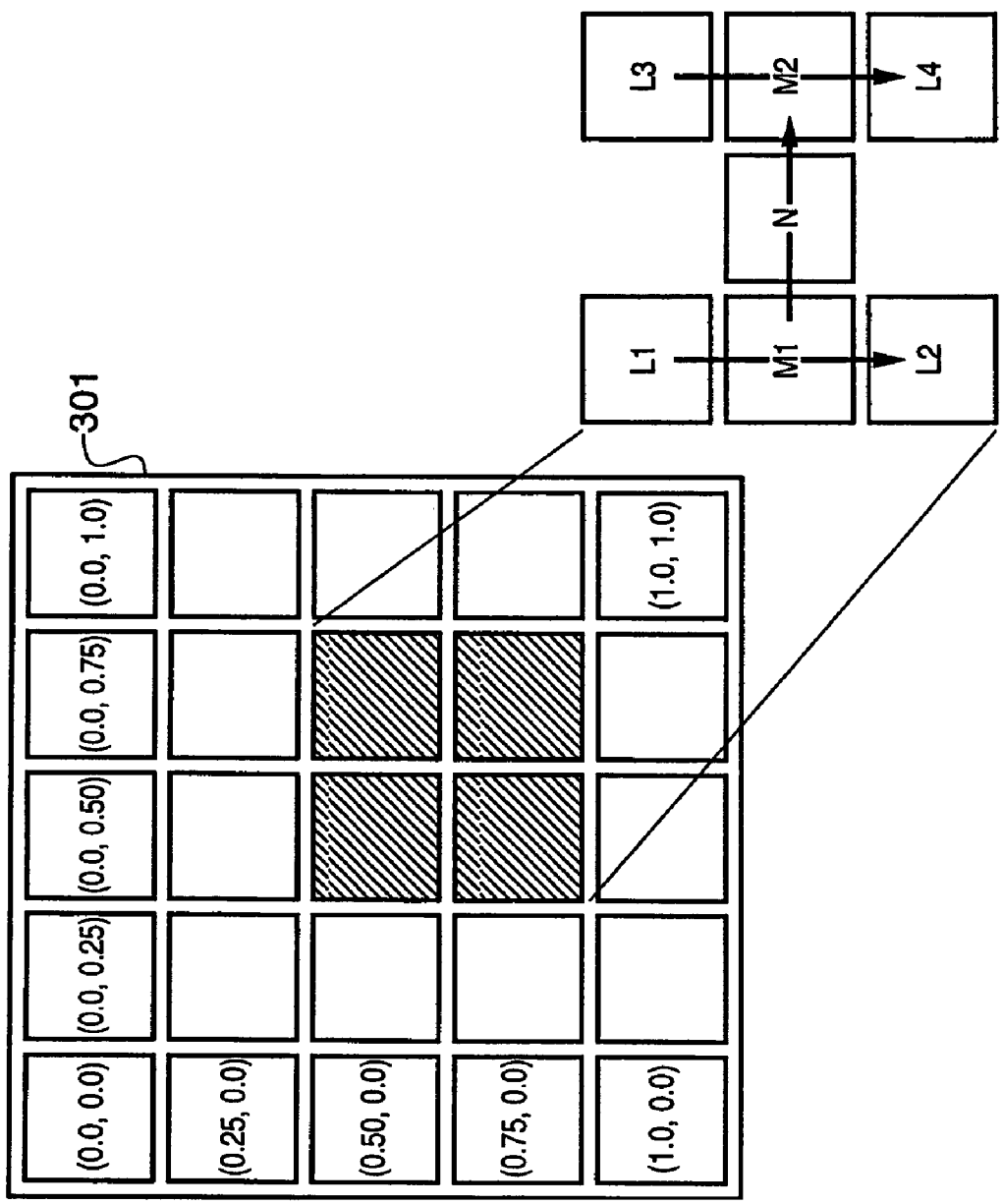
FIG. 5 is a view for explaining interpolation calculations of the spectral data.

FIG. 5 is a view for explaining interpolation calculations of the spectral data.

On the sample chart 301 shown in FIG. 5, patches of orange as a spot color are laid out in the vertical direction, and those of green as a spot color are laid out in the horizontal direction. In the following description, spectral data N of a given wavelength $\lambda$ of a composite spot color when the orange density is 60% and the green density is 70% (to be referred to as "OG (0.6, 0.7)" hereinafter) will be calculated. Let L1 be spectral data of OG(0.5, 0.5), L2 be spectral data of OG(0.75, 0.5), L3 be spectral data of OG(0.5, 0.75), and L4 be spectral data of OG(0.75, 0.75). Then, spectral data of a patch located at the midpoint of these four patches can be calculated.

As a method of how to proceed with interpolation calculations, spectral data M1 when the orange density is 60%, i.e., OG(0.6, 0.75), is calculated by linear interpolation in accordance with a change in orange density from OG(0.5, 0.5) to OG(0.75, 0.5). Likewise, spectral data M2 when the orange density is 60%, i.e., OG(0.6, 0.75), is calculated by linear interpolation in accordance with a change in orange density from OG(0.5, 0.75) to OG(0.75, 0.75). Then, spectral data N when the green density is 70%, i.e., OG(0.6, 0.7), is calculated by linear interpolation in accordance with a change in green density from OG(0.6, 0.5) to OG(0.6, 0.75).

About several thousand spot colors are used. Of these spot colors, several hundred colors are mainly used. Sample charts 301 are created by combining these mainly used spot colors, table data of its colorimetry result are registered as a colorimetry table, and a combinations of spot color names of respective table data are registered as a combination table in the spectral DB 125.

[Spot Color Processor]

Figure 6:
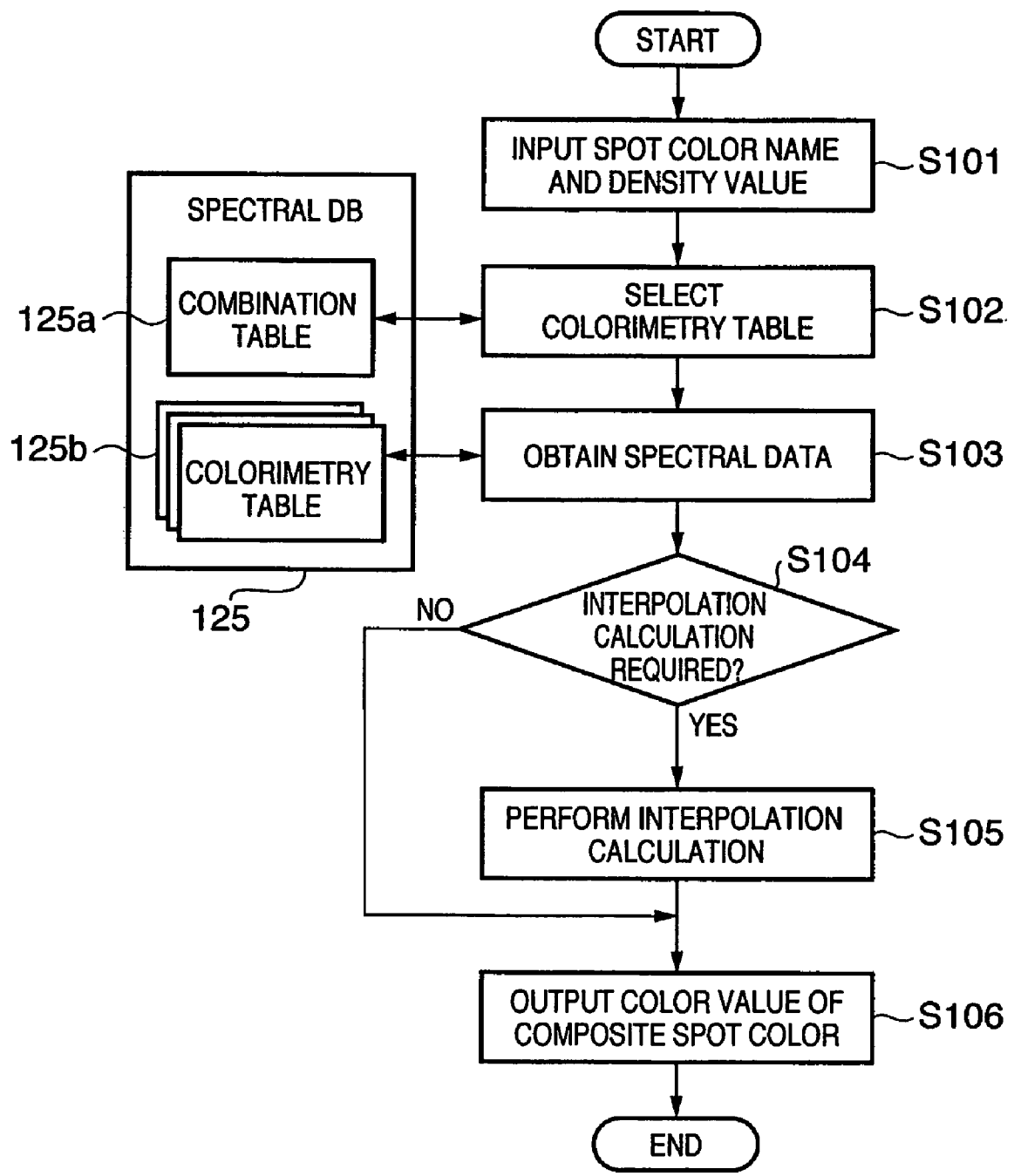
FIG. 6 is a flowchart showing the processing of a spot color processor.

FIG. 6 is a flowchart showing the processing of the spot color processor 124.

The spot color processor 124 receives the names of two spot colors (e.g., the names of orange, green, red, and the like, Munsel numbers, PANTONE® names, and the like) from the overlapping region processor 133 (S101). The spot color processor 124 selects a colorimetry table 125b corresponding to the two spot colors with reference to a combination table 125a which is exemplified in FIG. 7 and is registered in the spectral DB 125 (S102). The spot color processor 124 inputs the density values (or those before or after the density values) of the two spot colors to the colorimetry table 125b to obtain corresponding spectral data (S103). If the density values match grid values of the colorimetry table 125b, spectral data of the composite spot color is obtained by inputting the density values to the colorimetry table 125b. However, if the density values do not match any grid values, values on grids of the table near the density values are input to the colorimetry table 125b to obtain a plurality of spectral data required to make interpolation calculations of the composite spot color.

It is checked if interpolation calculations are to be made (S104). If interpolation calculations are required, the aforementioned interpolation calculations are made using the obtained spectral data (S105). The color value of the composite spot color is calculated from the obtained or interpolated spectral data, and is output to the overlapping region processor 133 (S106).

In this manner, a color value required to reproduce a composite spot color formed by combining arbitrary spot colors at arbitrary density values can be accurately calculated by the spectral database that stores the spectral data of mixed results of spot colors and the interpolation calculations.

In the above description, an example using 25 color patches as the sample chart 301 has been explained. Of course, a sample chart including more patches may be used.

The spot color processor 124 calculates a color value of a region rendered by one spot color. The spectral DB 125 stores spectral data corresponding to a plurality of density values of the spot color. Therefore, the spot color processor 124 obtains spectral data corresponding to the input name and density value of the spot color, executes the interpolation, and calculates a color value, as well as the process shown in FIG. 6.

Second Embodiment

Image processing according to the second embodiment of the present invention will be described below. Note that the same reference numerals in the second embodiment denote the same components as in the first embodiment, and a detailed description thereof will be omitted.

[Calculation of Composite Spot Color]

Figure 8:
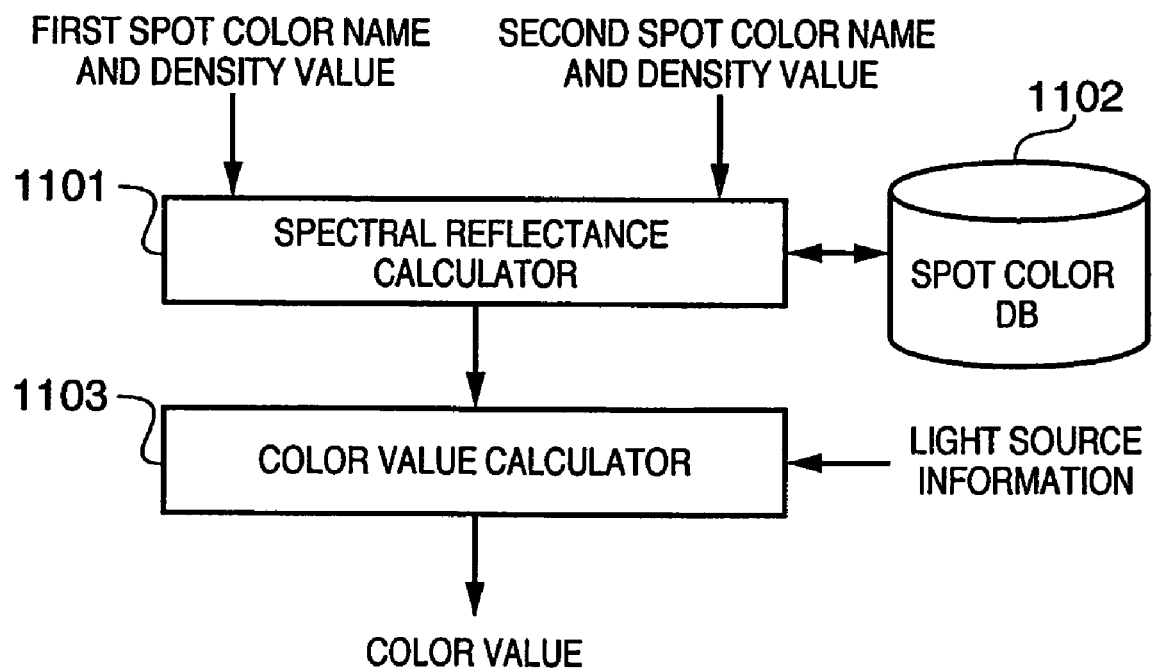
FIG. 8 is a diagram for explaining an overview of processing of the second embodiment (processing for obtaining a color value of a composite color of two spot colors)

FIG. 8 is a diagram for explaining an overview of the processing of the second embodiment, i.e., a diagram for explaining processing for obtaining a color value of a composite color of two spot colors.

Two spot color data (e.g., the names of orange, green, red, and the like, Munsel numbers, PANTONE® names, and the like) are input to a spectral reflectance calculator 1101. The spectral reflectance calculator 1101 obtains matched spectral reflectance data (to be referred to as "spectral data" hereinafter) from a spot color database (DB) 1102, and calculates a spectral reflectance of a composite color of the two spot colors. A color value calculator 1103 converts spectral data of the composite color input from the spectral reflectance calculator 1101 into a color value on a device independent color space such as CIELab or the like, and outputs the color value. In this case, light source information (D50, D65, or the like) of an observation light source is input. Of course, when one spot color data is input to the spectral reflectance calculator 1101, a color value corresponding to that spot color is output from the color value calculator 1103.

Also, spectral data can be obtained by printing a sample chart including patches formed by changing the densities of spot colors stepwise, and measuring the patches in the visible range. Spectral data corresponding to a density between neighboring patches can be calculated by linear interpolation from the spectral data of these two patches. Therefore, about several thousand spot colors are used. Sample charts of mainly used spot colors are created, and table data of colorimetry results are registered in the spot color DB 1102.

Figure 9:
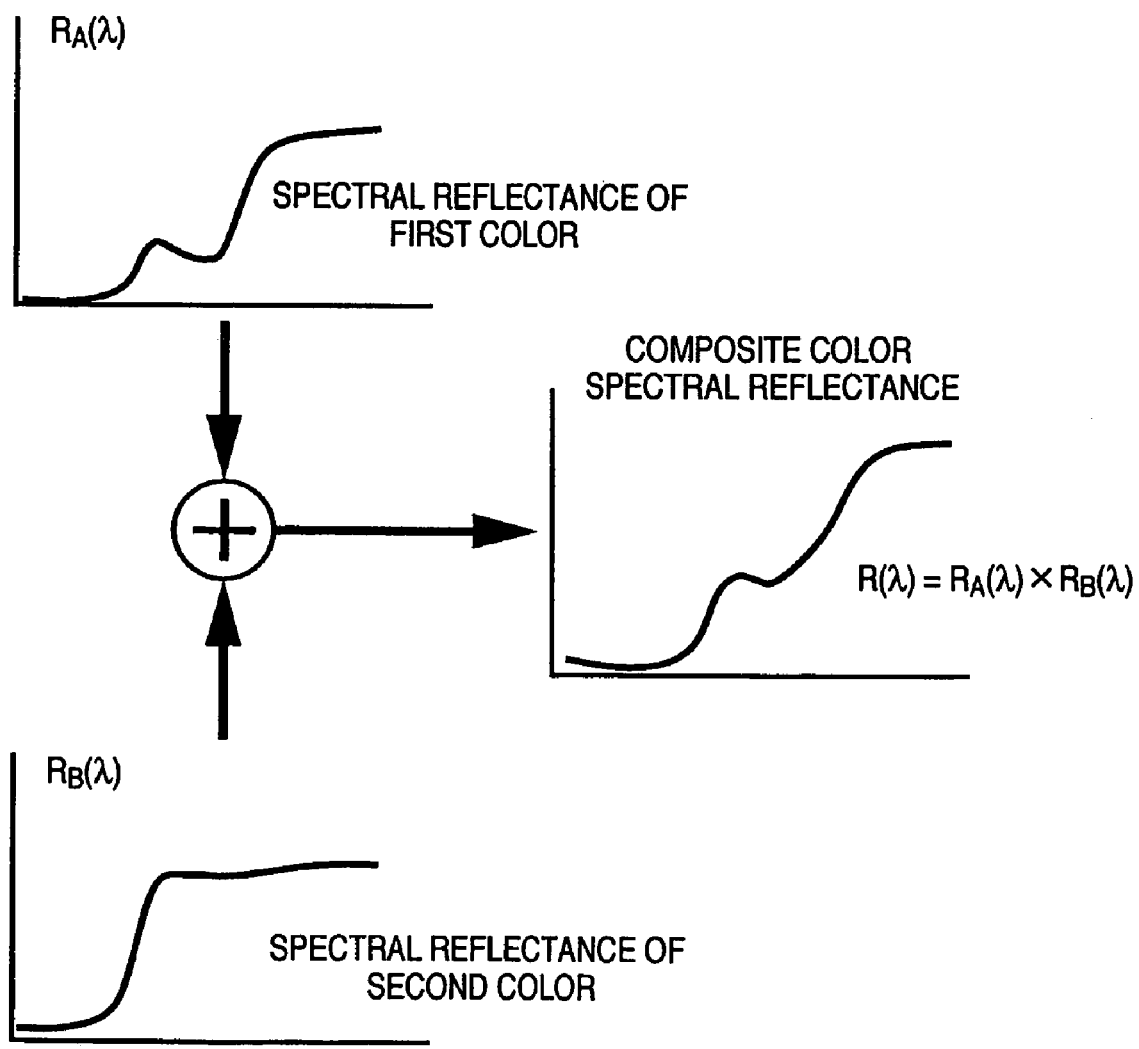
FIG. 9 is a view for explaining the process for calculating spectral data of a composite color from spectral reflectance data of two colors.

FIG. 9 is a view showing the process for calculating spectral data of a composite color obtained by compositing two colors based on spectral reflectance data of the two colors.

Since the spectral reflectance is a reflectance of light by an object for each wavelength, if the reflectance of light of given object A at an arbitrary wavelength $\lambda$ is $R_A(\lambda)$, the energy of reflected light when light of the wavelength $\lambda$ becomes incident on object A becomes $R_A(\lambda)$ times. Color composition based on the subtractive process in print processing or the like can consider a case wherein, for example, light reflected by object A (spectral reflectance $R_A(\lambda)$) is further reflected by object B (spectral reflectance $R_B(\lambda)$), and it is considered that the energy of light which becomes $R_A(\lambda)$ times by (the color of) object A further becomes $R_B(\lambda)$ times by (the color) of object B. That is, the spectral reflectance $R(\lambda)$ of the composite color of the two colors is given by $R_A(\lambda) \times R_B(\lambda)$.

[Arrangement of Printing Server]

Figure 10:
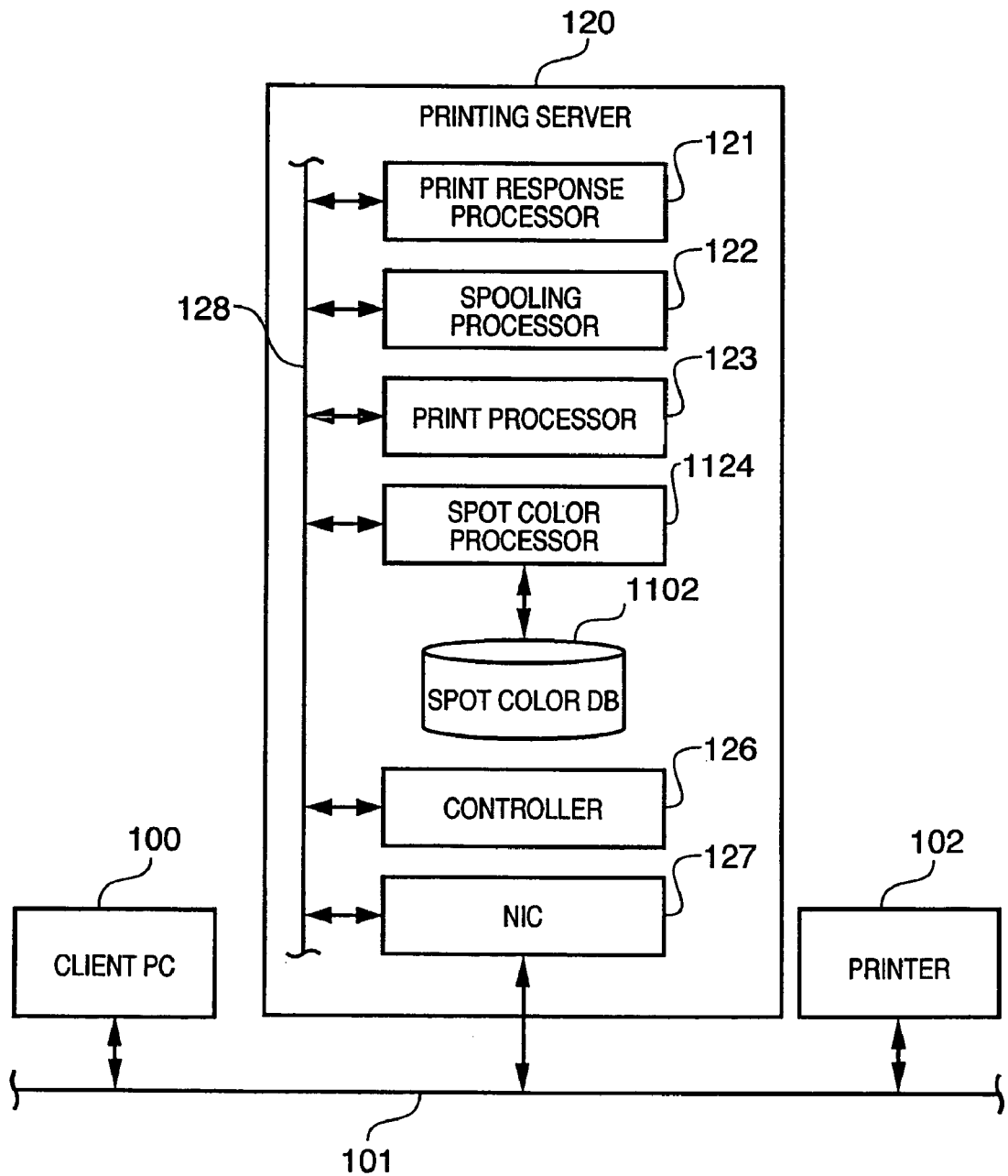
FIG. 10 is a block diagram showing the arrangement of a printing server of the second embodiment.

FIG. 10 is a block diagram showing the arrangement of a printing server of the second embodiment.

Upon reception of spot color data included in PDL data from the print processor 123, a spot color processor 1124 refers to the spot color DB 1102 and outputs a color value (e.g., Lab value) corresponding to that spot color data. When two spot color data are input, the spot color processor 1124 outputs a color value of a composite color of these spot colors. That is, the spot color processor 1124 executes the composite spot color calculation processing shown in FIG. 8. Note that the spot color DB 1102 is stored in a memory such as a hard disk or the like of the printing server 120.

[User Interface]

Figure 11:
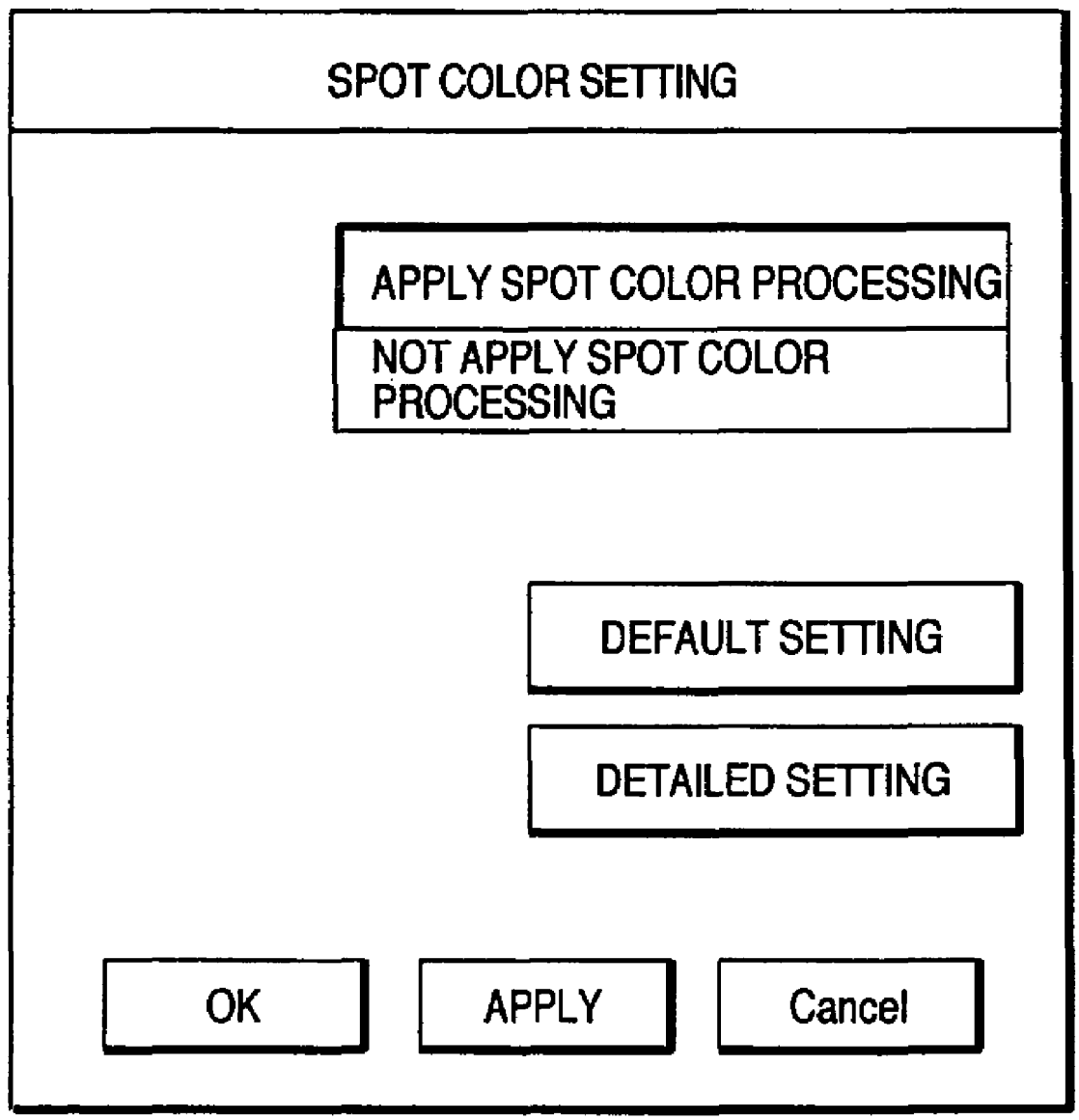
FIG. 11 shows a user interface provided by a controller.

When the user selects "not apply spot color processing" on a user interface shown in FIG. 11, the controller 126 does not allow the print processor 123 to obtain a color value by supplying spot color data to the spot color processor 1124. In this case, the print processor 123 obtains a device CMYK value or the like corresponding to spot color data with reference to a spot color-device CMYK value conversion table or the like stored in a memory such as a hard disk or the like of the printing server 120.

On the other hand, when the user selects "apply spot color processing", the controller 126 allows the print processor 123 to obtain a color value by supplying spot color data to the spot color processor 1124. In this case, the user can make further detailed settings using a user interface shown in FIG. 12.

Figure 12:
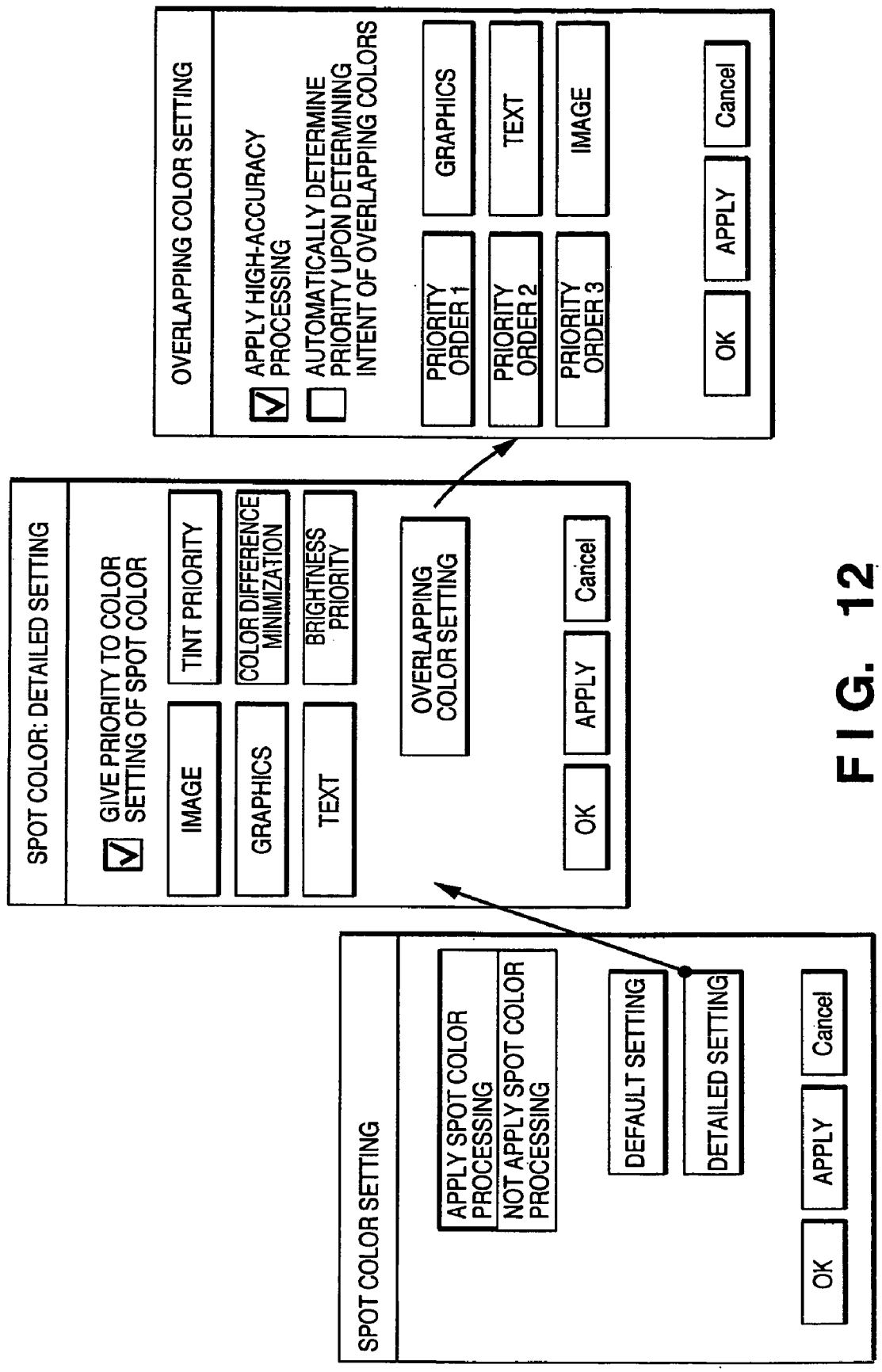
FIG. 12 shows an example of a detailed setting window displayed upon depression of a "detailed setting" button on the user interface shown in FIG. 11, and an example of an overlapping color setting window displayed upon depression of an "overlapping color setting" button.

FIG. 12 shows an example of a detailed setting window displayed upon depression of a "detailed setting" button on the user interface shown in FIG. 11, and an example of an overlapping color setting window displayed upon depression of an "overlapping color setting" button.

When the user checks a "give priority to color settings of spot colors" check box on the detailed setting window, he or she can independently make color settings in correspondence with the types (image, graphics, text) of respective objects designated with spot colors. Color settings (color matching methods) that can be set for respective objects correspond to the types of color conversion processes (tint priority, color difference minimization, brightness priority). That is, the print processor 123 converts a color value input from the spot color processor 1124 into a device CMYK value or the like. In this case, the print processor 123 adopts the color matching method according to the color setting which is set in accordance with the type of object. When the user unchecks the "give priority to color settings of spot colors" check box, default color settings of the system are selected.

Furthermore, when the user checks an "apply high-accuracy processing" check box on an overlapping color setting window displayed upon depression of an "overlapping color setting" button on the detailed setting window, the composite color calculations of spot colors based on spectral reflectance data, which have been explained using FIGS. 8 and 9, are executed.

In order to determine the color of an overlapping region of objects, a corresponding color matching method must be determined. If objects of different types overlap each other, a color matching method to be preferentially used must be defined in advance. This definition is important upon execution of object-dependent color processing. In the second embodiment, the priority order of object types can be set on the overlapping color setting window. In the example shown in FIG. 12, the priority order is set as graphics, text, and image. In this case, for example, when text and graphics objects overlap each other, the color value of the overlapping region is calculated, and a color matching method ("color difference minimization" in the example shown in FIG. 12) of the graphics object with higher priority is then applied to convert the color value into a device CMYK value. Likewise, when image and text objects overlap each other, the color value of the overlapping region is calculated, and a color matching method ("brightness priority" in the example shown in FIG. 12) of the text object is then applied to conversion of the color value of the object.

Of course, when objects of the same type overlap each other, a color matching method does not depend on the setting of the priority order, and the color matching method to be used can be uniquely determined. For example, when image objects overlap each other, a color matching method ("tint priority" in the example shown in FIG. 12) of the image object is then applied to the conversion of the color value of the object.

[Spot Color Processor]

Figure 13:
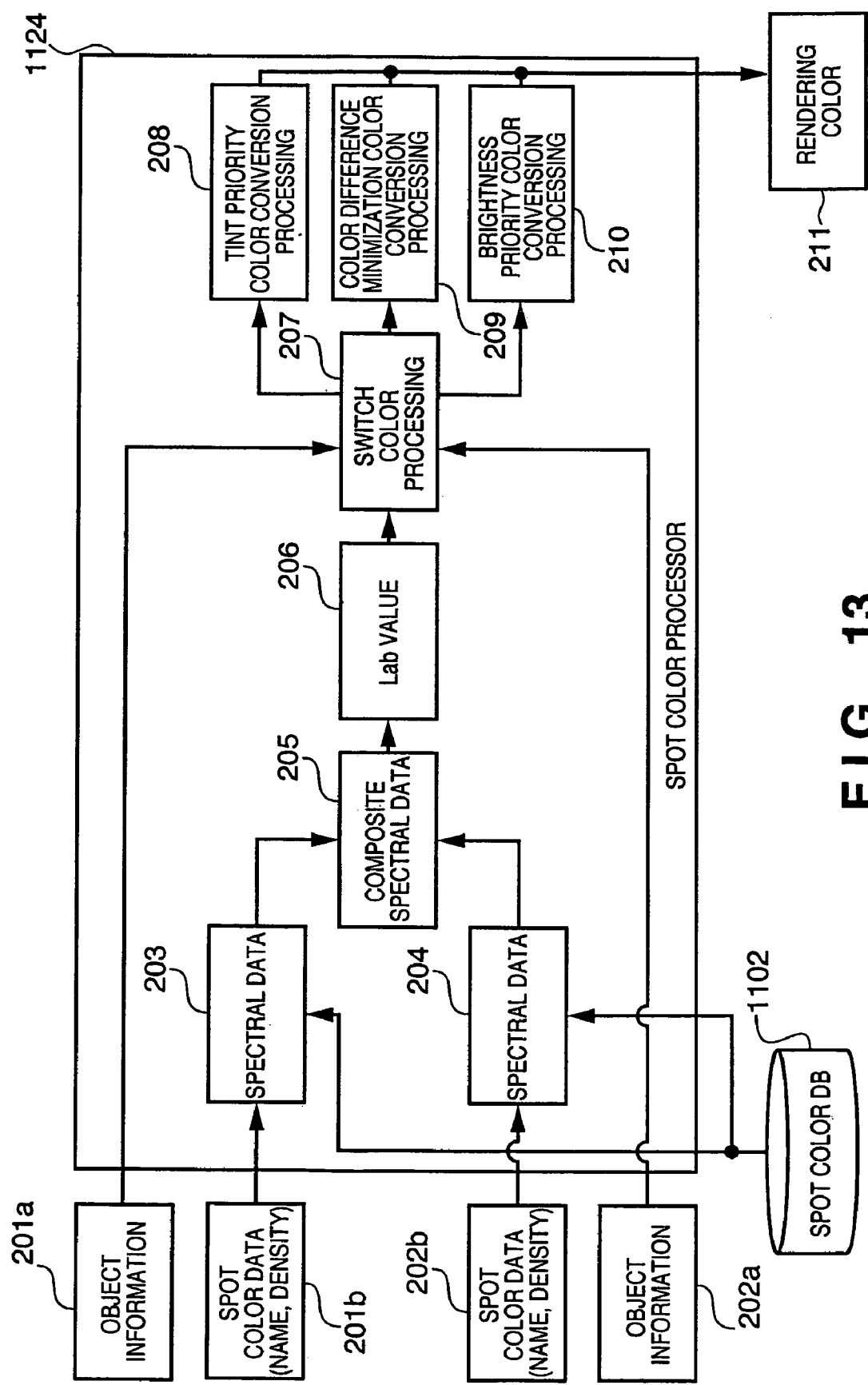
FIG. 13 is a block diagram showing the processing arrangement of a spot color processor.

FIG. 13 is a block diagram showing the processing arrangement of the spot color processor 1124.

The spot color processor 1124 receives information 201*a* and information 202*a* of two objects and their spot color data (names and densities) 201*b* and 202*b* from the print processor 123, and calculates a rendering color. Each spot color data includes a character string or the like. The spot color processor 1124 obtains spectral data 203 and 204 corresponding to the character strings of the two spot color data from the spot color DB 1102, and composites the obtained spectral data 203 and 204 to obtain composite spectral data 205. As the composition method of spectral data, the method described using FIG. 9 can be applied. When the density values do not match grid values of data stored in the spot color DB 1102, spectral data of the corresponding density is obtained by interpolation calculations.

Next, the spot color processor 1124 calculates a color value (e.g., Lab value) 206 from the composite spectral data. The color value 206 obtained in this case indicates a color of print ink, and is not guaranteed to be a color falling within the color gamut of a proof printer which conducts color simulation. Hence, the color value 206 must be converted into an appropriate color value. For this purpose, in the second embodiment, color conversion processing is applied to the color value 206. The color conversion processing is appropriately switched based on the object types included in the information 201*a* and information 202*a* of the objects since it must be switched depending on the type of object (207).

The second embodiment prepares three different color conversion processes, as described above. The spot color processor 1124 selectively applies a tint priority color conversion process 208, color difference minimization color conversion process 209, and brightness priority color conversion process 210 depending on the object type. The color value after the color conversion process is output as a rendering color 211 to the print processor 123.

When one spot color data is input, the spot color processor 1124 obtains its spectral data 203, converts it into a color value 206, applies the color conversion process according to the object type, and outputs a rendering color 211.

In this manner, a rendering color of a spot color or that of a composite color can be accurately calculated in correspondence with one spot color or a combination of arbitrary two spot colors.

Third Embodiment

Image processing according to the third embodiment of the present invention will be described below. Note that the same reference numerals in the third embodiment denote the same components as in the first and second embodiments, and a detailed description thereof will be omitted.

[Arrangement of Printing Server]

Figure 14:
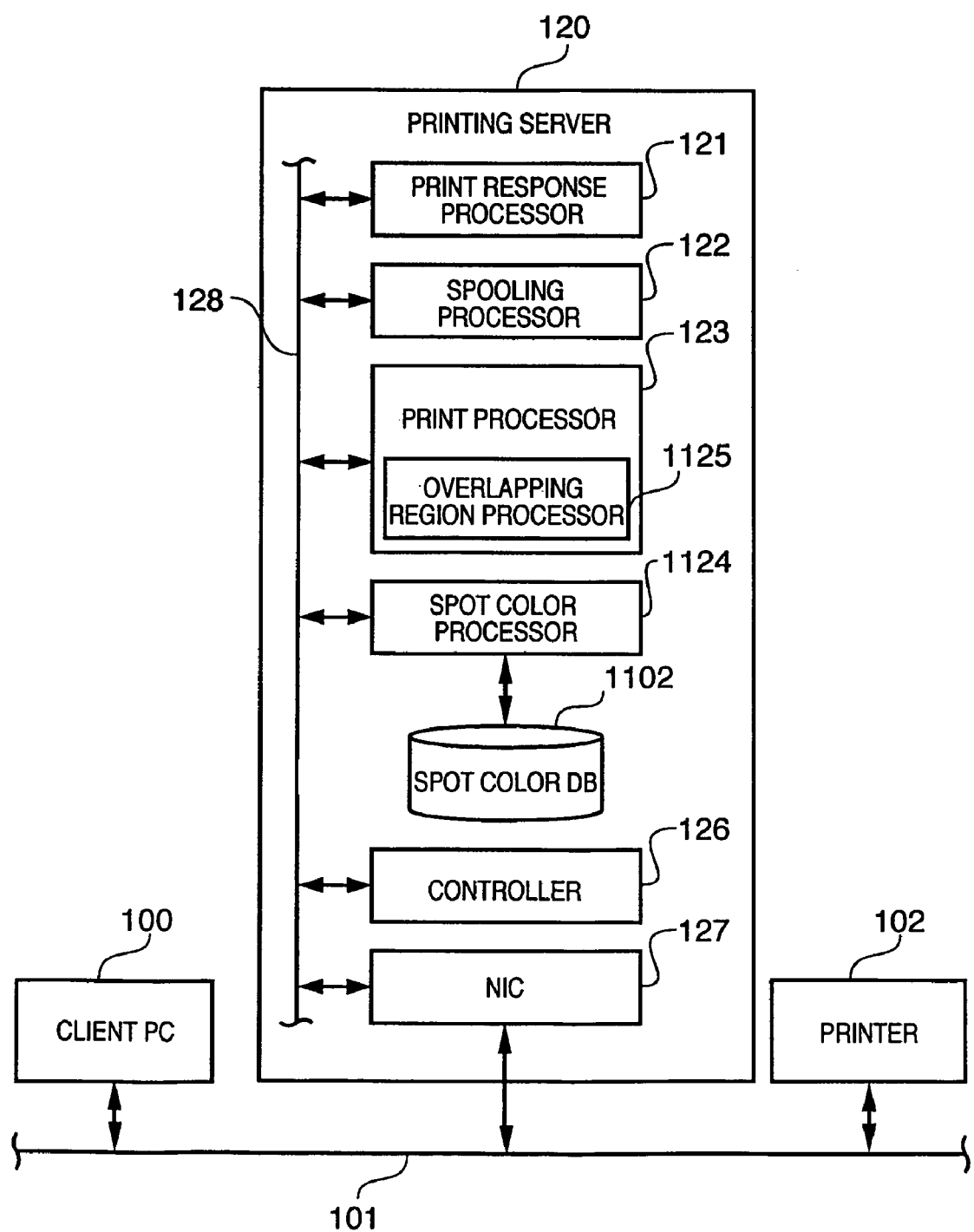
FIG. 14 is a block diagram showing the arrangement of a printing server of the third embodiment.

FIG. 14 is a block diagram showing the arrangement of a printing server of the third embodiment.

The print processor 123 interprets readout PDL data to convert it into intermediate code data, applies required processing, e.g., sort processing, imposition processing, and the like, renders the intermediate code data, and outputs the rendered data as output data such as a CMYK value or the like. In this case, the print processor 123 checks objects such as text, line image, picture, table, and the like of the input intermediate code data, and controls an overlapping region processor 1125 to process an overlapping portion of objects (overlapping region).

The overlapping region processor 1125 instructs RGB data and spot color data to the spot color processor 1124 with reference to the intermediate code data for an overlapping portion of RGB data (or CMYK data) and spot color data in the overlapping region. The overlapping region processor 1125 obtains a rendering color (e.g., Lab value) of a composite color on the basis of spectral data stored in the spot color DB 1102, as will be described in detail later.

[Segmentation of Overlapping Region]

As has been explained in the first embodiment using FIG. 3, the overlapping region need not be specified and segmented for opaque figures. However, in case of transparent figures, the overlapping region must be rendered using an overlapping color (composite color), and must be specified and segmented.

[Overlapping Region Processor]

Figure 15:
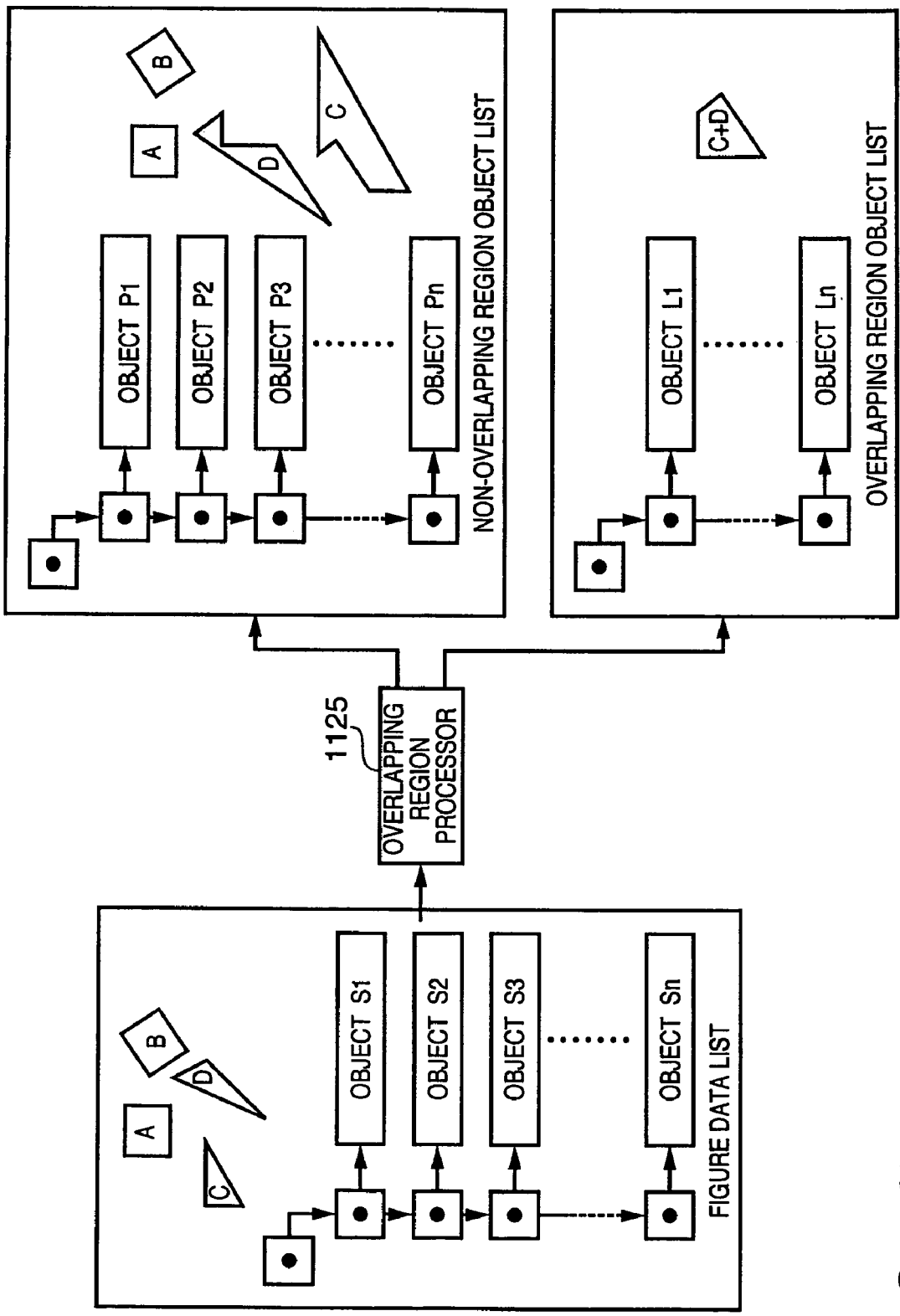
FIG. 15 is a diagram for explaining the processing of an overlapping region processor.

FIG. 15 is a diagram for explaining the processing of the overlapping region processor 1125, i.e., a schematic diagram showing the processing for extracting an overlapping region. Note that figure data in this system is held in a memory of the printing server 120 in the form of a list structure, and is processed as needed by respective processors.

As shown in FIG. 15, the overlapping region processor 1125 separates figure data (S1, S2, . . . , Sn) into a non-overlapping region object list (P1, P2, . . . , Pn), and an overlapping region object list (L1, L2, . . . , Ln). Note that an object of a non-overlapping region is an object which does not have any overlapping region with another object. On the other hand, objects of an overlapping region indicate an overlapping portion of objects (for example, a rectangular region formed by overlapping triangles C and D shown in FIG. 3).

Each of the figure data (S1, S2, . . . , Sn) is designated with a color space (e.g., an RGB color space, CMYK color space, spot color space, or the like) and its color value (e.g., numerical values (255, 0, 0) or the like, a character string "RED" indicating a spot color, or the like) In case of the objects of the non-overlapping regions, the designated colors of the figure data (S1, S2, . . . , Sn) are inherited to form the object list. On the other hand, in case of the objects of the overlapping regions, the color (composite color) of each overlapping region must be newly calculated, and no rendering colors are determined at the time of formation of the object list (L1, L2, . . . , Ln). In order to determine this rendering color, the color (composite color value) of the corresponding objects is calculated by the subsequent processing. In order to calculate the composite color, the color values of source figures which form an overlapping figure need be held.

For example, a case will be examined below wherein triangles C and D overlap each other, as shown in FIG. 3. Figure data of triangle C is object S1 on the figure list. As the color designation of object S1, "spot color space" is designated as a color space, and a character string "RED" is designated as a rendering color. Also, figure data of triangle D is object S2 on the figure list. As the color designation of object S2, "spot color space" is designated as a color space, and a character string "BLUE" is designated as a rendering color.

When an overlapping figure formed by overlapping these two figures is object L1, two pieces of color information "RED" and "BLUE" are registered as color information of object L1. That is, the color information registered in the overlapping figure includes the color spaces (spot color space in this example) of the objects of figure data (S1, S2) and their color values (character strings "RED" and "BLUE" indicating colors).

In the third embodiment, upon calculating a composite color, composite color calculation processing is switched as needed for each color space. That is, when the color information is an RGB value, mixed color calculation processing of an RGB color is applied; when it is a CMYK value, that of a CMYK color is applied; and when it is a spot color, composite color calculation processing of the spot color is applied.

Figure 16:
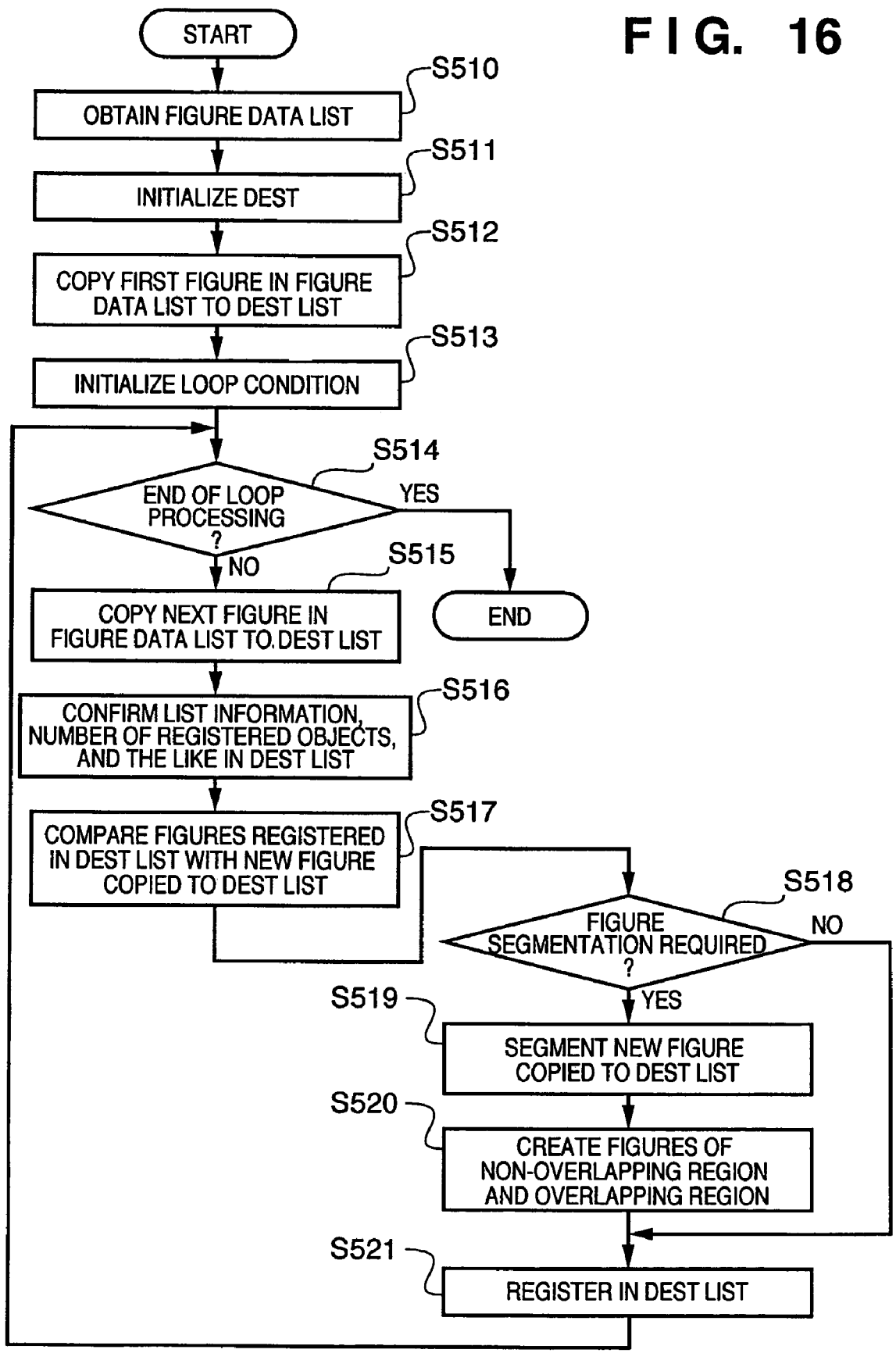
FIG. 16 is a flowchart for explaining the processing of the overlapping region processor.

FIG. 16 is a flowchart for explaining the processing of the overlapping region processor 1125.

The figure data list to be processed is acquired (S510), and a data list (DEST list) including two lists, i.e., the non-overlapping region object list and overlapping region object list, is initialized (S511). The first figure is copied from the figure data list to the DEST list (S512), a loop condition is initialized to start loop processing (S513), and it is checked if the loop processing is to end (S514).

If it is determined that the loop processing is to end, processing for extracting overlapping regions ends. If the loop processing is not to end, the next figure is copied from the figure data list to the DEST list (S515). Then, list information of the DEST list and the number of registered objects are confirmed (S516), and determination of figure attributes (transparency attributes) and comparison of position information are made so as to compare the figures already registered in the DEST list with the figure copied to the DEST list in step S515 (S517). It is checked as a result of comparison if figure segmentation is required (S518).

If figure segmentation is required, processing for obtaining a segmentation region of the figures is executed based on line information which forms the respective figures and the like, and segmentation processing is applied to the figure copied to the DEST list in step S515 (S519). Based on the segmentation processing result, figures (objects) of a non-overlapping region and overlapping region are created (S520). Then, the figure copied in step S515 or the figures generated in step S520 are registered in the DEST list (S521), and the flow returns to step 5514.

Note that step S514 is configured to determine that the loop processing is to end if the figure obtained in immediately preceding step S515 is the last one on the figure data list.

[Spot Color Processor]

Figure 17:
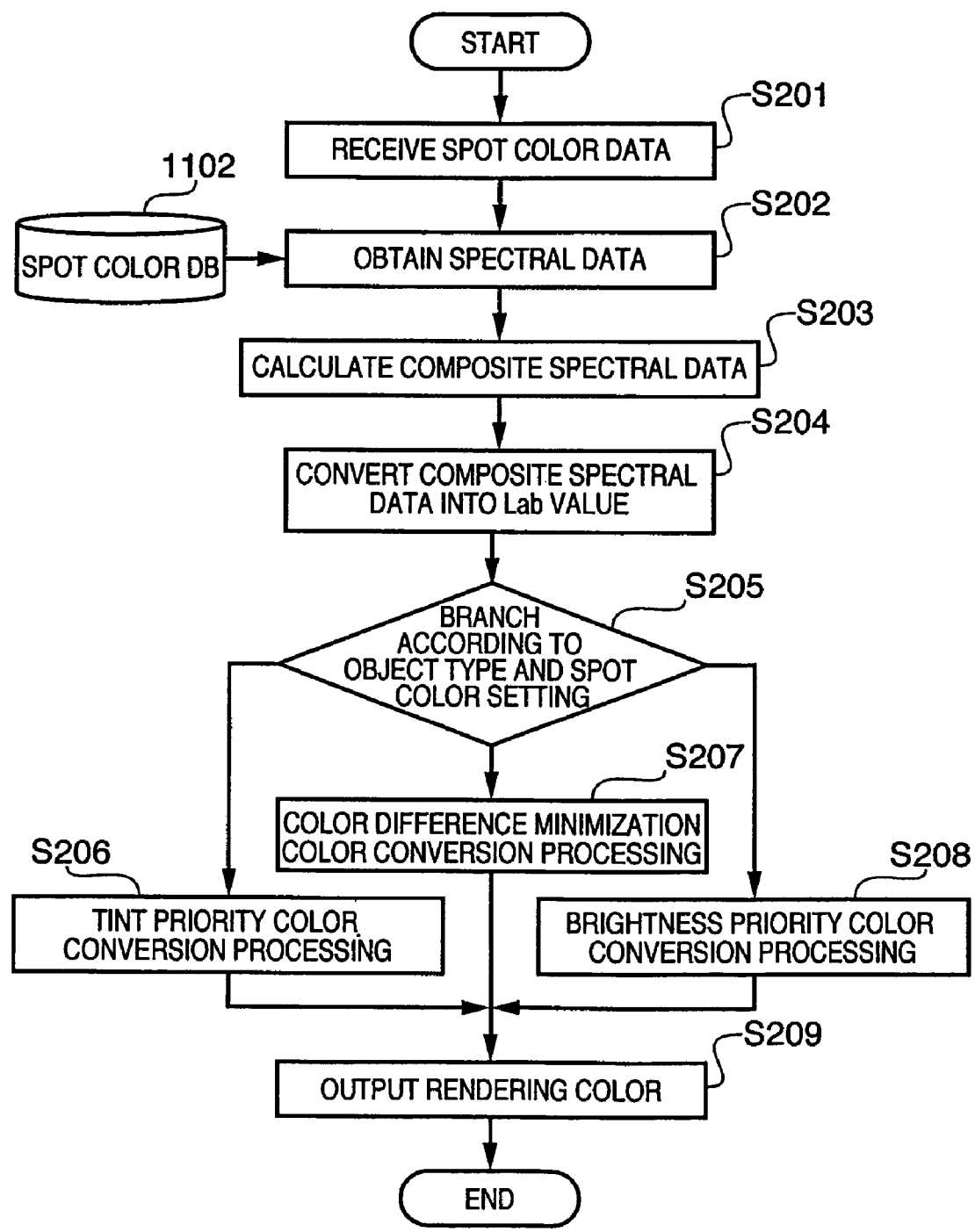
FIG. 17 is a flowchart showing the processing of a spot color processor.

FIG. 17 is a flowchart showing the processing of the spot color processor 1124.

The spot color processor 1124 receives information of one object (non-overlapping region) or two objects (overlapping region) and spot color data of the object (or objects) from the overlapping region processor 1125 (S201), and obtains spectral data corresponding to the spot color data from the spot color DB 1102 (S202). In this case, spectral data corresponding to the name and density value of a spot color is obtained using the spot color data. When the density value does not match any grid value of data stored in the spot color DB 1102, spectral data of the corresponding density is obtained by interpolation calculations.

Next, spectral data of a composite color is calculated based on the obtained spectral data by the aforementioned method (S203), and is converted into a color value (e.g., Lab value) (S204). The color conversion processing is selectively applied in accordance with the object type included in the object information (S205 to S208), and the color value after the color conversion processing is output as a rendering color to the overlapping region processor 1125 (S209).

In this manner, the rendering color of the composite color of the overlapping region can be accurately calculated.

Fourth Embodiment

Image processing according to the fourth embodiment of the present invention will be described below. Note that the same reference numerals in the fourth embodiment denote the same components as in the first to third embodiments, and a detailed description thereof will be omitted.

[Arrangement of Printing Server]

Figure 18:
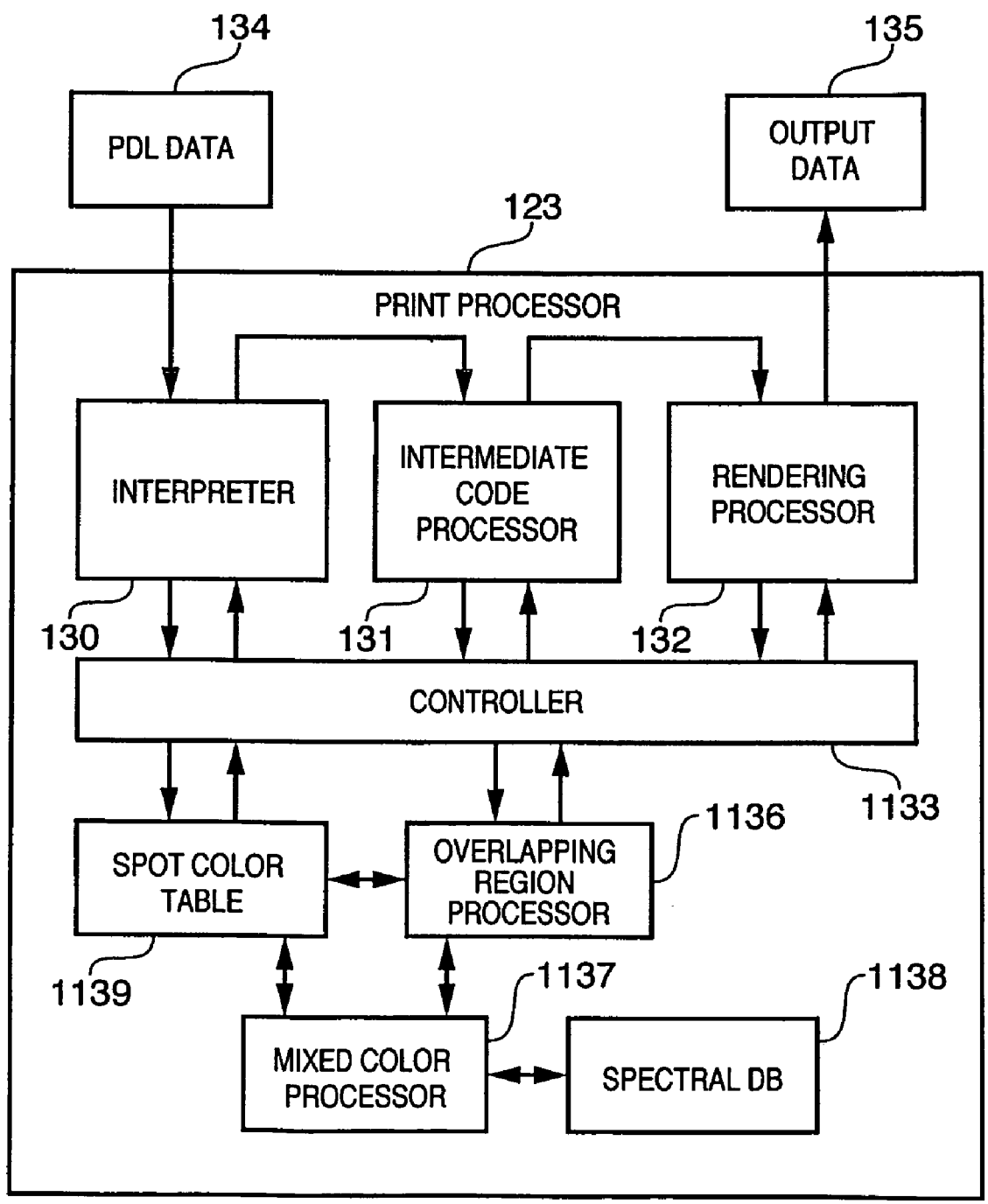
FIG. 18 is a block diagram showing the arrangement of a print processor of the fourth embodiment.

FIG. 18 is a block diagram showing the arrangement of the print processor 123.

The interpreter 130, intermediate code processor 131, and rendering processor 132 can respectively call an overlapping region processor 1136 via a controller 1133 which controls the print processor 123. Note that the controller 1133 exclusively controls the calls by the interpreter 130, intermediate code processor 131, and rendering processor 132. Therefore, when the interpreter 130 makes the call, the intermediate code processor 131 and rendering processor 132 cannot make the call.

This exclusive control is executed by the controller 1133 which refers to the settings of the printing server 120 stored in a nonvolatile memory. That is, the controller 1133 sets the print processor 123 which of the interpreter 130, intermediate code processor 131, and rendering processor 132 makes the call. Therefore, when the user sets the printing server 120 from the client PC 100, he or she can switch which of the interpreter 130, intermediate code processor 131, and rendering processor 132 makes the call as needed. In the following description, assume that the rendering processor 132 makes the call.

The overlapping region processor 1136 checks objects such as text, line image, picture, table, and the like of the input intermediate code data, and executes overlapping region processing of an overlapping portion of objects (overlapping region). The overlapping region processor 1136 obtains color values (e.g., Lab values) from a spot color table 1139 for objects designated with spot colors. Note that spot color data includes a character string indicating the name of a spot color. Therefore, the overlapping region processor 1136 obtains a color value corresponding to the character string of the spot color data from the spot color table 1139.

When an overlapping region is found, the overlapping region processor 1136 calls a mixed color processor 1137 to calculate the color value of the overlapping region by designating object colors. In this case, the mixed color processor 1137 calculates the color value of the overlapping region with reference to a spectral database (DB) 1138, as will be described in detail later.

Note that the spot color table 1139 and spectral DB 1138 are stored in a memory such as a hard disk or the like of the printing server 120.

The rendering processor 132 is notified of the color values of the spot colors and the color value of the overlapping region, which are calculated in this way, via the overlapping region processor 1136 and controller 1133. The rendering processor 132 executes rendering processing based on the obtained color values, and generates output data 135 such as a CMYK value or the like corresponding to the color of the overlapping region.

Note that segmentation of the overlapping region has been explained using FIG. 3, and the detailed processing of the overlapping region processor 1136 has been explained using FIGS. 15 and 16.

[Creation of Spectral DB]

Figure 19:
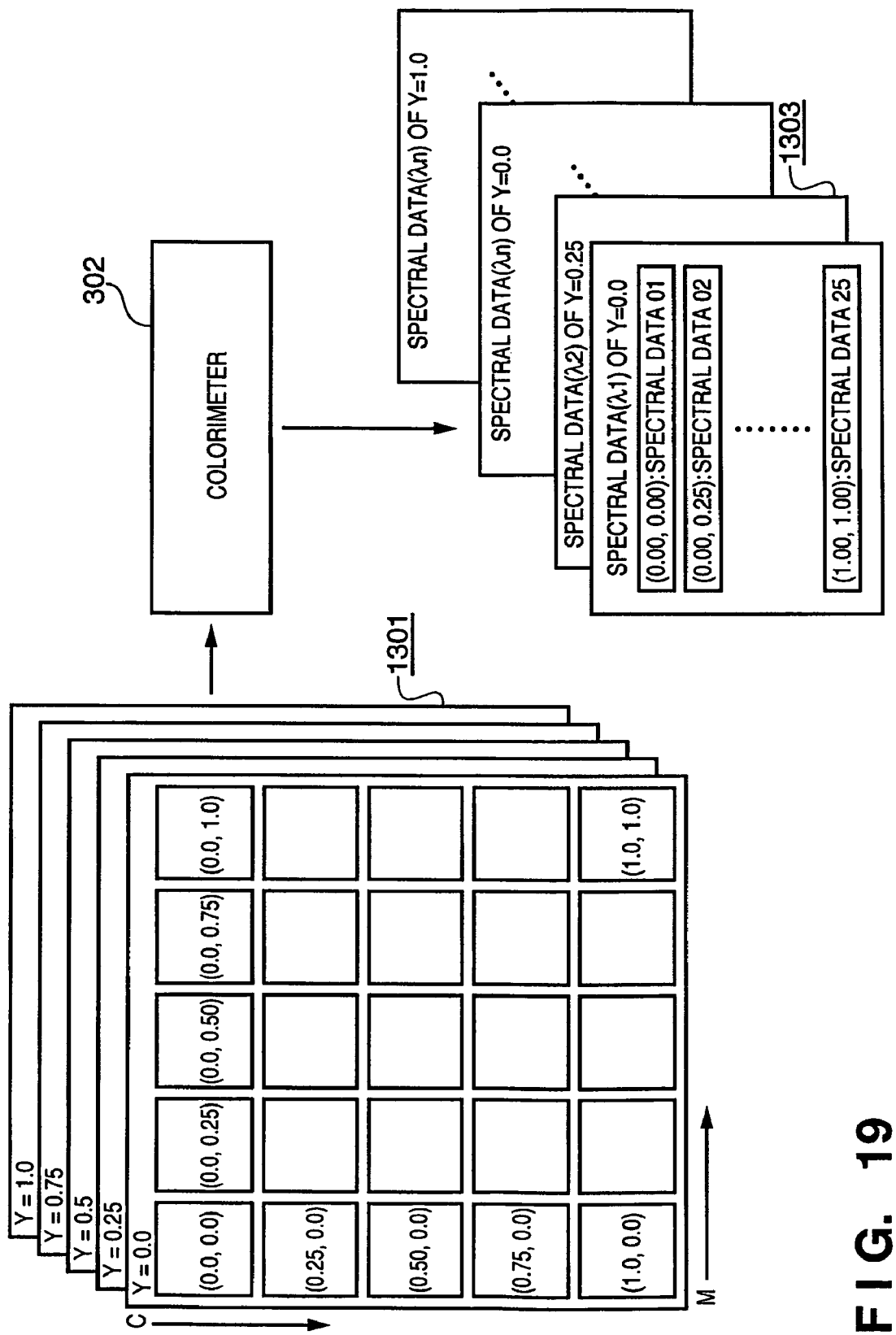
FIG. 19 is a view for explaining a method of creating a spectral DB.

FIG. 19 is a view for explaining a method of creating a spectral DB.

For example, in order to measure a color reproduced by three color materials C, M, and Y, as shown in FIG. 19, patches formed by changing the densities of the respective colors stepwise are printed. Note that the fourth embodiment uses a CMY color space as that for a mixed color. It is ideal to print patches using a combination of a printing machine and print sheets which are to undergo color calibration. For an approximate result, patches may be printed using a combination of another printer (e.g., the printer 102) and general-purpose print sheets.

When the density of each color is changed in increments of 25% within the range from 0% to 100%, five patches are obtained per color. By combining the three colors, sample charts 1301 having 125 patches are formed. Therefore, as shown in FIG. 19, a set of five color charts 1301, each of which has 25 patches formed by fixing the Y density and changing the densities of the remaining two colors, and which are prepared by combining variations of the Y densities, are created. When the colorimeter 302 measures the sample charts 1301 in increments of, e.g., 5 nm or 10 nm in the visible range, spectral data 1303 indicating spectral reflectance values of the visible range can be obtained as many as the combinations of density values of the three colors. Of course, spectral data between the density values of neighboring patches can be calculated by interpolation calculations of the spectral data 1303.

Figure 20:
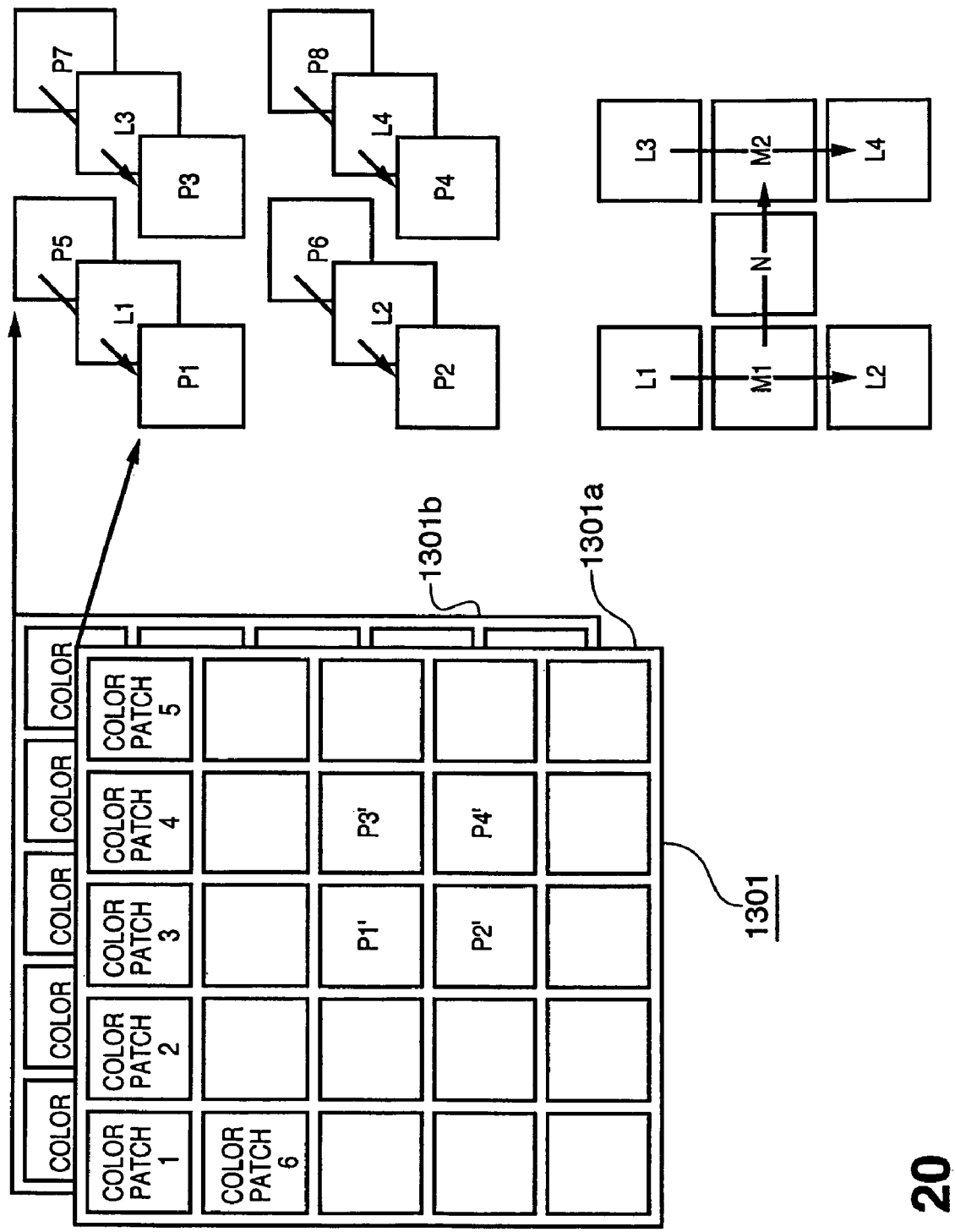
FIG. 20 is a view for explaining interpolation calculations of spectral data.

FIG. 20 is a view for explaining interpolation calculations of spectral data.

Assume that, for example, C patches are laid out in the vertical direction, M patches are laid out in the horizontal direction, and Y patches are laid out in the depth direction on the sample charts 1301 shown in FIG. 20. In the following description, spectral data N when the C, M, and Y densities are 60%, 70%, and 10% (to be described as "(0.6, 0.7, 0.1)" hereinafter) will be calculated.

Assume that spectral data of patches P1', P2', P3', and P4' on a color chart 1301a of Y=0% are:

P1'(0.5, 0.5, 0)=P1
P2'(0.75, 0.5, 0)=P2
P3'(0.5, 0.75, 0)=P3
P4'(0.75, 0.75, 0)=P4

Likewise, assume that spectral data of patches P5', P6', P7', and P8' on a color chart 1301b of Y=25% are:

P5'(0.5, 0.5, 0.25)=P5
P6'(0.75, 0.5, 0.25)=P6
P7'(0.5, 0.75, 0.25)=P7
P8'(0.75, 0.75, 0.25)=P8

Then, a colorimetric value of a patch at the midpoint of these eight patches can be calculated.

As a method of how to proceed with interpolation calculations, spectral data L1 when Y=10%, i.e., (0.5, 0.5, 0.1), is calculated by linear interpolation in accordance with a change in Y density from P1' to P5'. Likewise, spectral data L2 when Y=10%, i.e., (0.75, 0.5, 0.1), is calculated by linear interpolation in accordance with a change in Y density from P2' to P6'. Also, spectral data L3 when Y=10%, i.e., (0.5, 0.75, 0.1), is calculated by linear interpolation in accordance with a change in Y density from P3' to P7'. Furthermore, spectral data L4 when Y=10%, i.e., (0.75, 0.75, 0.1), is calculated by linear interpolation in accordance with a change in Y density from P4' to P8'.

Then, spectral data M1 when C=60%, i.e., (0.6, 0.5, 0.1), is calculated by linear interpolation in accordance with a change in C density (50%→75%) corresponding to that from L1 to P2. Likewise, spectral data M2 when C=60%, i.e., (0.6, 0.75, 0.1), is calculated by linear interpolation in accordance with a change in C density (50%→75%) corresponding to that from L3 to L4. Finally, spectral data N when M=70%, i.e., (0.6, 0.5, 0.1), is calculated by linear interpolation in accordance with a change in M density (50%→75%) corresponding to that from M1 to M2.

Not only the spectral data 1303 (1138a) but also a three-dimensional table required to convert a color value (e.g., Lab value) for rendering into a CMY value must be registered in the spectral DB 1138. Then, CMY values corresponding to grid values (e.g., Lab values) of the three-dimensional table are estimated from the spectral data 1303 of the colorimetry results by the above interpolation calculations to create an Lab-CMY conversion table 1138b, which is registered in the spectral DB 1138.

[Mixed Color Processor]

Figure 21:
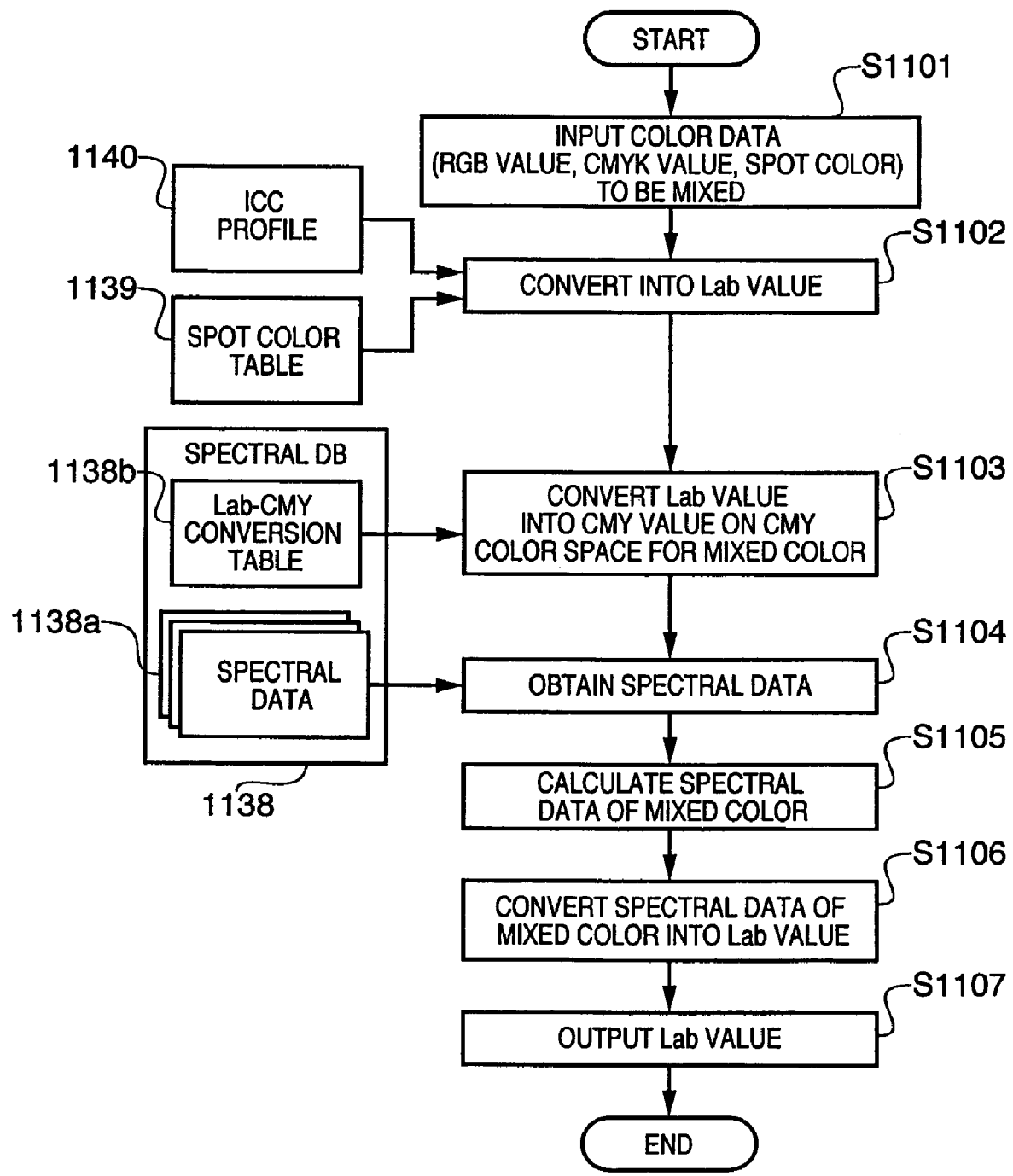
FIG. 21 is a flowchart showing the processing of a mixed color processor.

FIG. 21 is a flowchart showing the processing of the mixed color processor 1137.

The mixed color processor 1137 receives color data (RGB data, CMYK data, or spot color data) from the overlapping region processor 1136 (S1101), and converts the color data into Lab values for rendering (S1102). In this case, RGB data and CMYK data are converted into Lab values with reference to an ICC profile 1140 (stored in a memory such as a hard disk or the like of the printing server 120). Also, spot color data includes a character string indicating the name of a spot color. Therefore, the mixed color processor 1137 obtains an Lab value corresponding to the character string of the spot color data from the spot color table 1139.

The mixed color processor 1137 converts the Lab values into CMY values on the CMY color space for mixed colors with reference to the Lab-CMY conversion table 1138b in the spectral DB 1138 (S1103). When an Lab value matches a grid value of the Lab-CMY conversion table 1138b, a corresponding CMY value can be obtained by inputting that Lab value to the Lab-CMY conversion table 1138b. However, when an Lab value does not match any grid value of the Lab-CMY conversion table 1138b, values on grids near that Lab value are input to the Lab-CMY conversion table 1138b to obtain a plurality of CMY values required for the above interpolation calculations or tetrahedron interpolation, and a corresponding CMY value is obtained by the interpolation calculations.

Next, the mixed color processor 1137 obtains spectral data corresponding to the respective converted colors on the CMY color space for mixed colors from the spectral data 1138a (via interpolation calculations if necessary) (S1104). The mixed color processor 1137 calculates spectral data of a mixed color (S1105), converts the spectral data of the mixed color into an Lab value (S1106), and outputs that Lab value to the overlapping region processor 1136 (S1107). The spectral data of the mixed color is calculated in step S1105 as follows.

Spectral data are measured as a set of reflectance data indicating reflectance values of patches at a given wavelength in the visible range (e.g., 360 to 760 nm). Therefore, if the reflectance values of two colors at a given wavelength are 80% and 60%, the reflectance of a mixed color at that wavelength can be calculated by 0.8×0.6=0.48.

In this manner, when the reflectance of a mixed color of two colors in the visible range is calculated to obtain a set of reflectance data of mixed colors, XYZ values and Lab values can be obtained from them, as described above. Note that the present invention is not limited to two colors, and Lab values of mixed colors of combinations of arbitrary colors can be calculated. That is, even when source data is RGB data, CMYK data, or spot color data, respective colors are expressed on the CMY color space for mixed colors. In this way, spectral data corresponding to respective colors are obtained, and their mixed color result (spectral data and Lab value after mixing) can be accurately calculated.

Fifth Embodiment

Image processing according to the fifth embodiment of the present invention will be described below. Note that the same reference numerals in the fifth embodiment denote the same components as in the first to fourth embodiments, and a detailed description thereof will be omitted.

[Print Processor]

Figure 22:
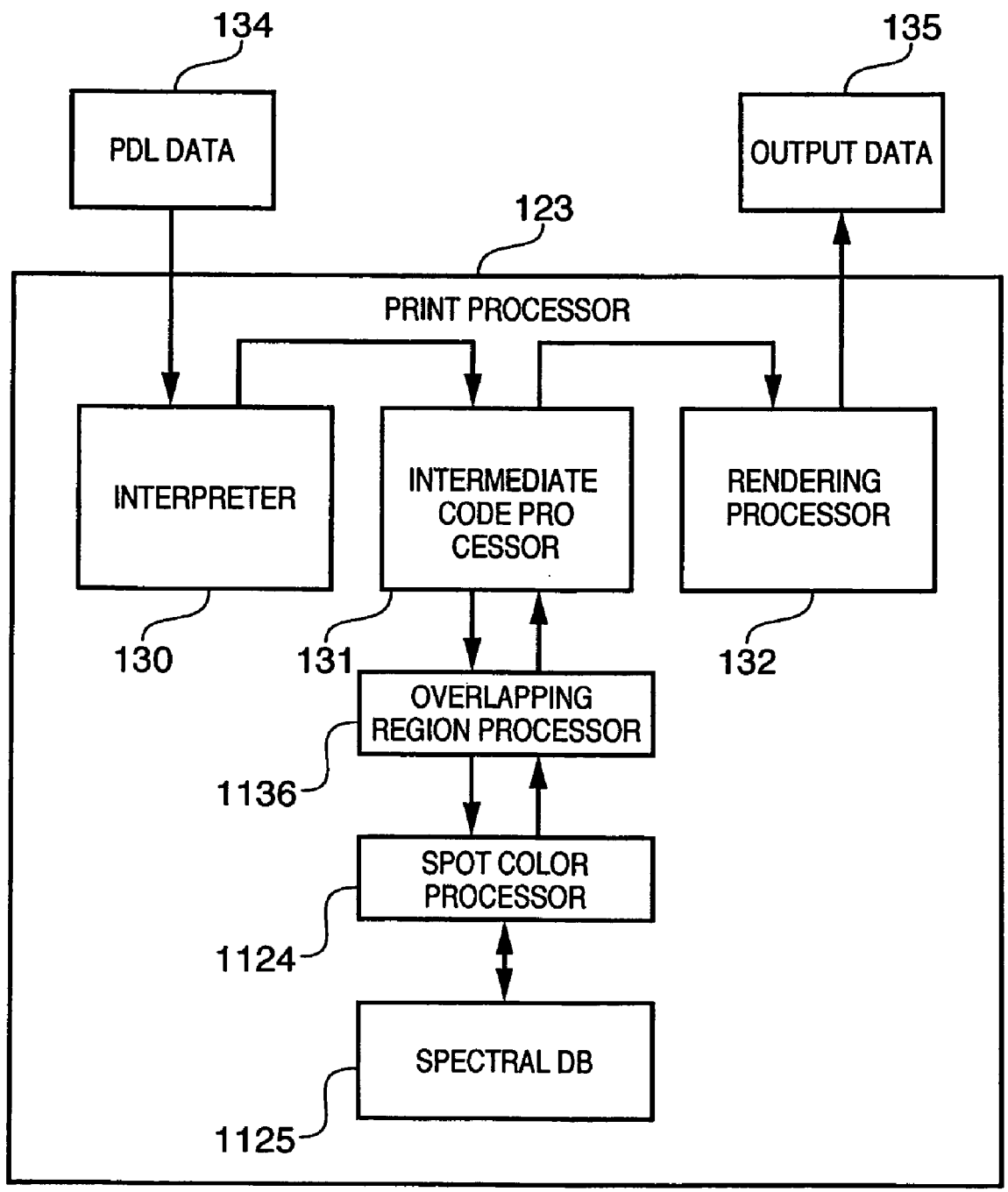
FIG. 22 is a block diagram showing the arrangement of a print processor of the fifth embodiment.

FIG. 22 is a block diagram showing an example of the arrangement of the print processor 123 in the printing server 120 of the fifth embodiment.

The intermediate code processor 131 checks objects such as text, line image, picture, table, and the like of input intermediate code data, and controls the overlapping region processor 1136 to process an overlapping portion of objects (overlapping region).

The overlapping region processor 1136 instructs RGB data and spot color data to the spot color processor 1124 with reference to the intermediate code data for an overlapping portion of RGB data (or CMYK data) and spot color data in the overlapping region. The overlapping region processor 1136 obtains a color value (e.g., Lab value) of a mixed color on the basis of spectral data stored in a spectral database (DB) 1125, as will be described in detail later. Note that the spectral DB 1125 is stored in a memory such as a hard disk or the like of the printing server 120.

In this manner, the intermediate code processor 131 can obtain the color value of the mixed color including the spot color of the overlapping region. The intermediate code processor 131 embeds the obtained color value in the intermediate code data, and passes that data to the rendering processor 132. The rendering processor 132 executes rendering based on the intermediate code data received from the intermediate code processor 131, and generates output data 135 such as a CMYK value or the like corresponding to the mixed color including the spot color of the overlapping region.

[Spot Color Processor]

Figure 23:
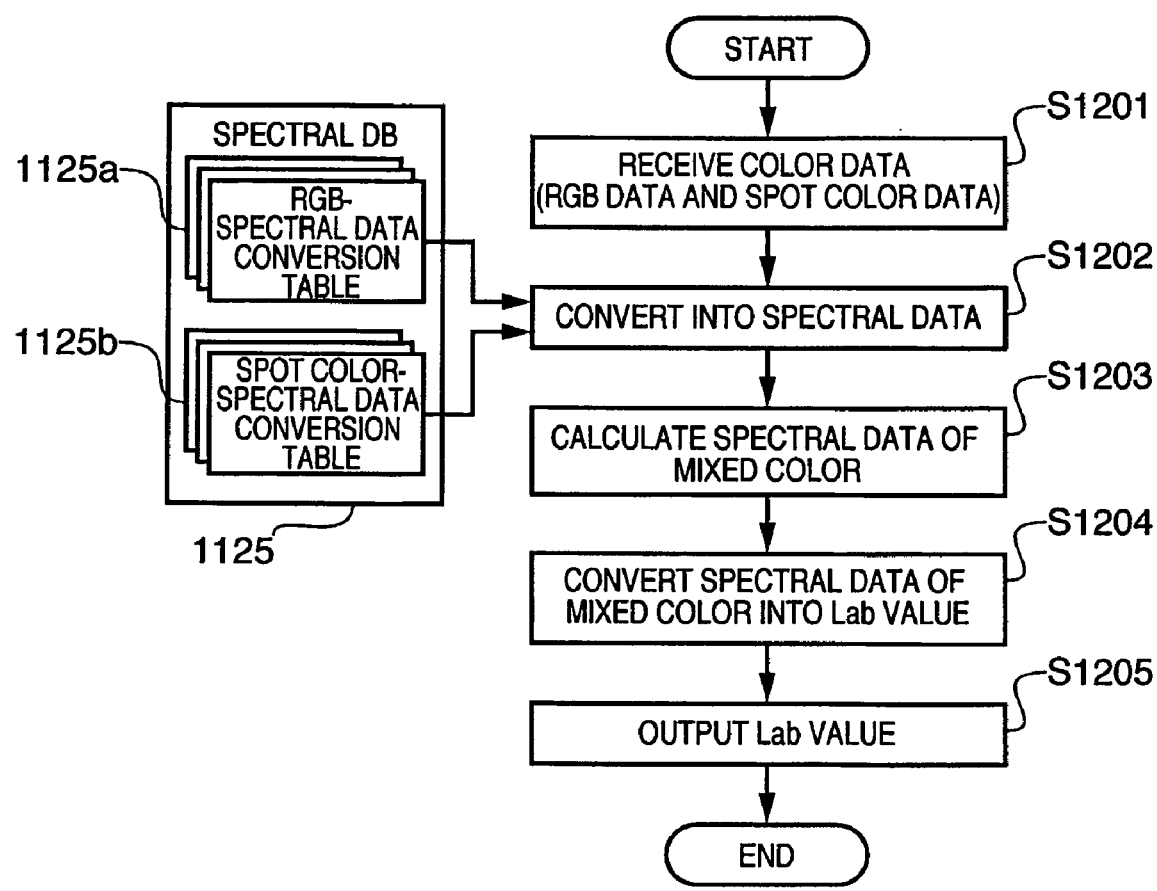
FIG. 23 is a flowchart showing the processing of a spot color processor.

FIG. 23 is a flowchart showing the processing of the spot color processor 1124.

The spot color processor 1124 receives RGB data (or CMYK data) and spot color data from the overlapping region processor 1136 (S1201), and converts these color data into spectral data (S1202). In this case, the RGB data is converted into spectral data with reference to an RGB-spectral data conversion table 1125*a* in the spectral DB 1125. As for the spot color data, spectral data corresponding to the name and density value of that spot color is obtained with reference to a spot color-spectral data conversion table 1125*b* in the spectral DB 1125.

The method of creating the RGB-spectral data conversion table 1125*a* will be described later. Also, the fundamentals of the creation method of the spot color-spectral data conversion table 1125*b* are the same as colorimetry described in the fourth embodiment. However, since about several thousand spot colors are used, sample charts 1301 of these spot colors are created and measured. Then, table data of the colorimetry results are registered in the spectral DB 1125.

When data matches a grid value of the colorimetry table 1125*a* or 1125*b*, spectral data corresponding to that data is obtained by inputting the data to the colorimetry table 1125*a* or 1125*b*. However, when data does not match any grid value, values on grids of the table near that data are input to the colorimetry table 1125*a* or 1125*b* to obtain a plurality of spectral data required for the interpolation calculations, and corresponding spectral data is obtained by the same interpolation calculations as described above or tetrahedron interpolation.

The spot color processor 1124 calculates spectral data of a mixed color based on the obtained spectral data by the aforementioned method (S1203), converts the spectral data of the mixed color into a color value (e.g., Lab value) for rendering (S1204), and outputs the color value to the overlapping region processor 1136 (S1205).

[RGB-Spectral Data Conversion Table]

Figure 24:
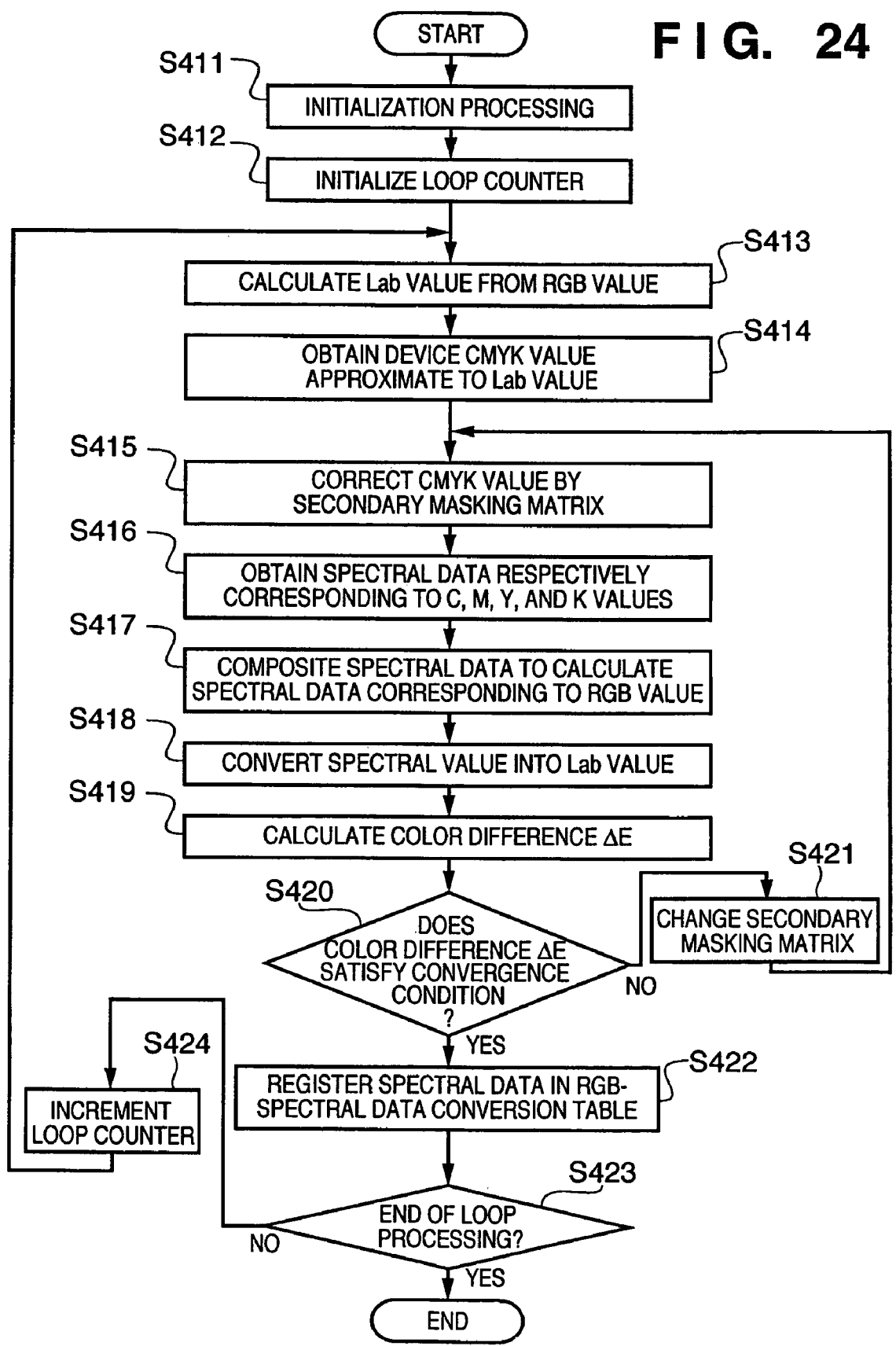
FIG. 24 is a flowchart for explaining a method of creating an RGB-spectral data conversion table.

FIG. 24 is a flowchart for explaining a method of creating the RGB-spectral data conversion table 1125*a*. Note that this processing is executed in advance by the controller 126 or the like of the printing server 120.

Initially, initialization of the RGB-spectral data conversion table 1125*a*, that of a masking matrix, and the like is made (S411). Note that the RGB-spectral data conversion table 1125*a* is a data class (or structure) which holds spectral data corresponding to input RGB values, and comprises array data.

Loop counters r, g, and b are reset to zero (S412), and loop processing for sequentially generating RGB values of 729 colors starts so as to create a table in increments of 8 steps ($9^3$=729 colors).

An Lab value is calculated from an RGB value ((32*r*−1, 32*g*−1, 32*b*−1) in this example) (S413). If an RGB color space (e.g., sRGB or AdobeRGB) is set by the system, an RGB value can be converted into an XYZ value, and the XYZ value can be further converted into an Lab value using a corresponding ICC profile or the like.

A device CMYK value approximate to the calculated Lab value is obtained (S414). Conversion into the device CMYK value uses a printer profile designated by the system.

The obtained CMYK value is corrected by a secondary masking matrix (S415), and spectral data corresponding to the corrected C, M, Y, and K values are obtained (S416). For example, if spectral data when cyan (C) is output at a density value=100% is measured in advance, spectral data of C at a density value=50% can be calculated by linear interpolation. Likewise, when spectral data of other colors, i.e., magenta (M), yellow (Y), and black (K) at a density value=100% are measured in advance, spectral data at an arbitrary density value can be calculated by linear interpolation.

After the spectral data corresponding to the C, M, Y, and K values are obtained, these spectral data are composited, as described above, thus calculating spectral data corresponding to the RGB value (S417).

Next, the calculated spectral data is converted into an Lab value (S418), and a color difference ΔE between the Lab value obtained in step S418 and that obtained in step S414 is calculated (S419). It is then checked if the color difference ΔE satisfies a convergence condition which is arbitrarily given in advance (S420). If it is determined that the color difference ΔE does not satisfy the convergence condition, the aforementioned secondary masking matrix is changed as needed (S421), and the flow returns to step S415. On the other hand, if the color difference ΔE satisfies the convergence condition, the spectral data calculated by the series of processes is registered in the RGB-spectral data conversion table 1125*a* (S422).

It is checked if the loop processing is complete (S423). If the loop processing is not complete yet, any of the loop counters is incremented (S424), and the flow returns to step S413. If all the loop counters r, g, and b have reached the value of the increment width ("8" in this example), it is determined that the loop processing is complete, thus ending creation of the RGB-spectral data conversion table 1125*a*.

In this manner, the table for converting an arbitrary RGB value into spectral data which reproduces that color can be created.

In the above description, 125 color patches are used as the sample charts 1301. Of course, sample charts including more patches may be used.

Modification of Embodiments

The above description has been given under the condition of a printing device. Of course, the effect of the present invention is not limited by output devices, and the same effect can be obtained for other output devices such as a monitor and the like. In case of media of a printing system, a subtractive process is applied. However, in case of a monitor of an additive process model or the like, mixed color models are different, but the same effect can be obtained as long as the object upon configuring the system matches color simulation.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

Claim of Priority

This application claims priority from Japanese Patent Application No. 2004-360501, No. 2004-360502, and No. 2004-360503 filed on Dec. 13, 2004, which is hereby incorporated by reference herein.

What is claimed is:

1. An image processing apparatus for processing an input image which uses a color material of a spot color except for process colors, comprising:
 a memory which stores colorimetric values of colors represented by mixing spot colors;
 a detector, arranged to detect a mixed color region, where spot colors are mixed, from the input image;
 a calculator, arranged to calculate a colorimetric value of the detected mixed color region by using density of each spot color in the detected mixed color region and the colorimetric values stored in said memory; and
 a color conversion unit, arranged to convert the calculated colorimetric value into color data dependent on an output device.

2. The apparatus according to claim 1, wherein the colorimetric value is spectral data, and said calculator interpolates spectral data corresponding to the density of the each spot color in the detected mixed color region using a plurality of the spectral data stored in said memory, and calculates a color value from the calculated spectral data.

3. The apparatus according to claim 1, wherein said color conversion unit converts input color in a region of the input image, where the color material of the spot color is not used, into the color data dependent on the output device using conversion data of an input device and conversion data of the output device.

4. The apparatus according to claim 1, wherein said memory stores tables respectively corresponding to each combination of the spot colors, and each table indicates a correspondence between density and a colorimetric value.

5. The apparatus according to claim 1, wherein said detector detects an overlapping region of objects, and determines whether the detected overlapping region is the mixed color region or not, based on transparency attributes of the objects.

6. An image processing method of processing an input image which uses a color material of a spot color except for process colors, the method comprising the steps of:
 detecting a mixed color region, where spot colors are mixed, from the input image;
 calculating a colorimetric value of the detected mixed color region by using density of each spot color in the detected mixed color region and colorimetric values stored in a memory, wherein the memory stores the colorimetric values of colors represented by mixing spot colors; and
 converting the calculated colorimetric value into color data dependent on an output device.

7. The method according to claim 6, wherein the colorimetric value is spectral data, and the calculating step interpolates spectral data corresponding to the density of the each spot color in the detected mixed color region using a plurality of the spectral data stored in the memory, and calculates a color value from the calculated spectral data.

8. The method according to claim 6, wherein the converting step converts input color in a region of the input image, where the color material of the spot color is not used, into the color data dependent on the output device using conversion data of an input device and conversion data of the output device.

9. The method according to claim 6, wherein the memory stores tables respectively corresponding to each combination of the spot colors, and each table indicates a correspondence between density and a colorimetric value.

10. The method according to claim 6, wherein the detecting step detects an overlapping region of objects, and determines whether the detected overlapping region is the mixed color region or not, based on transparency attributes of the objects.

11. A computer-readable storage medium storing a computer-executable program for causing a computer to perform a method of processing an input image which uses a color material of a spot color except for process colors, the method comprising the steps of:
 detecting a mixed color region, where spot colors are mixed, from the input image;
 calculating a colorimetric value of the detected mixed color region by using density of each spot color in the detected mixed color region and colorimetric values stored in a memory, wherein the memory stores the colorimetric values of colors represented by mixing spot colors; and
 converting the calculated colorimetric value into color data dependent on an output device.

* * * * *